US009938861B2

(12) United States Patent
Huntington

(10) Patent No.: US 9,938,861 B2
(45) Date of Patent: Apr. 10, 2018

(54) FUEL COMBUSTING METHOD

(71) Applicant: Richard A. Huntington, Houston, TX (US)

(72) Inventor: Richard A. Huntington, Houston, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 607 days.

(21) Appl. No.: 14/175,715

(22) Filed: Feb. 7, 2014

(65) Prior Publication Data
US 2014/0230445 A1 Aug. 21, 2014

Related U.S. Application Data

(60) Provisional application No. 61/767,688, filed on Feb. 21, 2013.

(51) Int. Cl.
F01K 23/10 (2006.01)
F02C 3/34 (2006.01)
F02C 9/28 (2006.01)
F02D 41/14 (2006.01)

(52) U.S. Cl.
CPC ............... *F01K 23/10* (2013.01); *F02C 3/34* (2013.01); *F02C 9/28* (2013.01); *F02D 41/1444* (2013.01); *F02D 41/1454* (2013.01); *F05D 2270/08* (2013.01); *F05D 2270/0831* (2013.01); *Y02E 20/16* (2013.01); *Y02T 50/677* (2013.01)

(58) Field of Classification Search
CPC ............. F05D 2220/32; F05D 2240/32; F05D 2270/08; F05D 2270/0831; F02C 3/04; F02C 3/34; F02C 9/28; F01K 233/10; Y02E 20/16; F02D 41/1444; F02D 41/1454; Y02T 50/677
USPC ............... 60/772, 39.182, 39.5, 39.52; 165/4
See application file for complete search history.

(56) References Cited

U.S. PATENT DOCUMENTS

| 2,488,911 | A | 11/1949 | Hepburn et al. |
| 2,884,758 | A | 5/1959 | Oberle |
| 3,631,672 | A | 1/1972 | Gentile et al. |
| 3,643,430 | A | 2/1972 | Emory et al. |
| 3,705,492 | A | 12/1972 | Vickers |

(Continued)

FOREIGN PATENT DOCUMENTS

| CA | 2231749 | 9/1998 |
| CA | 2645450 | 9/2007 |

(Continued)

OTHER PUBLICATIONS

U.S. Appl. No. 13/596,684, filed Aug. 28, 2012, Slobodyanskiy et al.

(Continued)

*Primary Examiner* — Peter Helvey
(74) *Attorney, Agent, or Firm* — ExxonMobil Upstream Research Company Law Department

(57) ABSTRACT

The present techniques are directed to systems and a method for combusting a fuel in a gas turbine. An exemplary method includes providing a fuel to a combustor on a gas turbine, providing an oxidant to the combustor, and combusting the fuel and the oxidant in the combustor to produce an exhaust gas. At least a portion of the exhaust gas is passed through a water-gas shifting catalyst to form a low CO content product gas.

45 Claims, 8 Drawing Sheets

(56) References Cited

U.S. PATENT DOCUMENTS

| | | |
|---|---|---|
| 3,841,382 A | 10/1974 | Gravis, III et al. |
| 3,949,548 A | 4/1976 | Lockwood, Jr. |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz, III |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson, Jr. et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |

(56) References Cited

U.S. PATENT DOCUMENTS

| | | |
|---|---|---|
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier, Jr. |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |

(56) References Cited

U.S. PATENT DOCUMENTS

| | | | |
|---|---|---|---|
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear, Jr. et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,765 B2 * | 2/2009 | Akiyama .............. C01B 3/0005 423/648.1 |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman, II et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Dalla Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Huntley Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,966,830 B2 * | 6/2011 | Daggett .................. B64D 27/02 60/780 |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |

(56) References Cited

U.S. PATENT DOCUMENTS

| | | |
|---|---|---|
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,572,959 B2 * | 11/2013 | Ingersoll ............ F02C 6/16 60/512 |
| 8,616,294 B2 | 12/2013 | Zubrin et al. |
| 8,627,643 B2 | 1/2014 | Chillar et al. |
| 8,679,331 B2 * | 3/2014 | Bowers ............ E02B 1/003 210/170.11 |
| 8,685,254 B2 * | 4/2014 | Bowers ............ A01G 15/00 210/170.11 |
| 8,715,496 B2 * | 5/2014 | Bowers ............ A01G 15/00 210/170.11 |
| 8,776,518 B1 * | 7/2014 | Das ............ F01K 3/188 60/641.2 |
| 8,821,602 B2 * | 9/2014 | McAlister ............ F03G 6/00 423/648.1 |
| 8,826,657 B2 * | 9/2014 | McAlister ............ F03G 7/05 60/495 |
| 8,887,504 B2 * | 11/2014 | Julian ............ F24H 1/24 60/651 |
| 8,916,735 B2 * | 12/2014 | McAlister ............ C10L 1/02 201/21 |
| 8,991,510 B2 * | 3/2015 | Saar ............ 166/272.1 |
| 2001/0000049 A1 | 3/2001 | Kataoka et al. |
| 2001/0029732 A1 | 10/2001 | Bachmann |
| 2001/0045090 A1 | 11/2001 | Gray, Jr. |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0039462 A1 * | 2/2005 | Bellows ............ B01D 53/1418 60/772 |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0048517 A1 * | 3/2006 | Fradette ............ B01D 53/84 60/772 |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0178035 A1 * | 8/2007 | White ............ C01B 3/52 423/248 |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0134666 A1 * | 6/2008 | Kulkarni ............ C01B 3/12 60/227 |
| 2008/0155984 A1 | 7/2008 | Liu et al. |
| 2008/0173021 A1 * | 7/2008 | Pfefferle ............ F02C 3/28 60/780 |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |

(56) References Cited

U.S. PATENT DOCUMENTS

| | | |
|---|---|---|
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman, II et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0003553 A1* | 1/2010 | Pfefferle .............. C10J 3/00 429/415 |
| 2010/0018216 A1* | 1/2010 | Fassbender ........... F01K 13/00 60/780 |
| 2010/0018218 A1 | 1/2010 | Riley et al. |
| 2010/0024432 A1* | 2/2010 | Pfefferle ............ F01K 23/068 60/780 |
| 2010/0058732 A1 | 3/2010 | Kaufmann et al. |
| 2010/0058771 A1* | 3/2010 | Gil ..................... C01B 3/38 60/780 |
| 2010/0115960 A1 | 5/2010 | Brautsch et al. |
| 2010/0126176 A1 | 5/2010 | Kim |
| 2010/0126906 A1 | 5/2010 | Sury |
| 2010/0132366 A1* | 6/2010 | Lutz .................... C01B 3/34 60/780 |
| 2010/0162703 A1 | 7/2010 | Li et al. |
| 2010/0170253 A1 | 7/2010 | Berry et al. |
| 2010/0180565 A1 | 7/2010 | Draper |
| 2010/0218507 A1* | 9/2010 | Cherson .................. C01B 3/12 60/780 |
| 2010/0281878 A1* | 11/2010 | Wormser ............... C10J 3/482 60/781 |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0061385 A1* | 3/2011 | Baxter ................. F01K 13/00 60/649 |
| 2011/0072779 A1 | 3/2011 | ELKady et al. |
| 2011/0079017 A1* | 4/2011 | Gulen .................. F01K 23/10 60/783 |
| 2011/0088379 A1 | 4/2011 | Nanda |
| 2011/0110759 A1 | 5/2011 | Sanchez et al. |
| 2011/0120137 A1* | 5/2011 | Ennis ............... H01M 8/04082 60/780 |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0008175 A1* | 1/2013 | McKenna ............... C01B 3/382 60/780 |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |

FOREIGN PATENT DOCUMENTS

| | | |
|---|---|---|
| EP | 0770771 | 5/1997 |
| GB | 0776269 | 6/1957 |
| GB | 2117053 | 10/1983 |
| WO | WO1999006674 | 2/1999 |
| WO | WO1999063210 | 12/1999 |
| WO | WO2007068682 | 6/2007 |
| WO | WO2008142009 | 11/2008 |
| WO | WO2011003606 | 1/2011 |
| WO | WO2012003489 | 1/2012 |
| WO | WO2012128928 | 9/2012 |
| WO | WO2012128929 | 9/2012 |
| WO | WO2012170114 | 12/2012 |
| WO | WO2013147632 | 10/2013 |
| WO | WO2013147633 | 10/2013 |
| WO | WO2013155214 | 10/2013 |
| WO | WO2013163045 | 10/2013 |

OTHER PUBLICATIONS

U.S. Appl. No. 14/066,579, filed Oct. 29, 2013, Huntington et al.
U.S. Appl. No. 14/066,551, filed Oct. 29, 2013, Minto.
U.S. Appl. No. 14/144,511, filed Dec. 30, 2013, Thatcher et al.
U.S. Appl. No. 14/067,559, filed Oct. 30, 2013, Lucas John Stoia et al.
PCT/RU2013/000162, Feb. 28, 2013, General Electric Company.
U.S. Appl. No. 14/067,679, filed Oct. 30, 2013, Elizabeth Angelyn Fadde et al.

(56) References Cited

OTHER PUBLICATIONS

U.S. Appl. No. 14/067,714, filed Oct. 30, 2013, Carolyn Ashley Antoniono et al.
U.S. Appl. No. 14/067,726, filed Oct. 30, 2013, Carolyn Ashley Antoniono et al.
U.S. Appl. No. 14/067,731, filed Oct. 30, 2013, Carolyn Ashley Antoniono et al.
U.S. Appl. No. 14/067,739, filed Oct. 30, 2013, Carolyn Ashley Antoniono et al.
U.S. Appl. No. 14/067,797, filed Oct. 31, 2013, Anthony Wayne Krull et al.
U.S. Appl. No. 14/066,488, filed Oct. 29, 2013, Pramod K. Biyani et al.
U.S. Appl. No. 14/135,055, filed Dec. 19, 2013, Pramod K. Biyani et al.
U.S. Appl. No. 14/067,844, filed Oct. 30, 2013, John Farrior Woodall et al.
PCT/US13/036020, Apr. 10, 2013, General Electric Company/ExxonMobil Upstream Company.
U.S. Appl. No. 14/067,486, filed Oct. 30, 2013, Huntington et al.
U.S. Appl. No. 14/067,537, filed Oct. 30, 2013, Huntington et al.
U.S. Appl. No. 14/067,552, filed Oct. 30, 2013, Huntington et al.
U.S. Appl. No. 14/067,563, filed Oct. 30, 2013, Huntington et al.

* cited by examiner

100

FUEL COMBUSTING METHOD

CROSS REFERENCE TO RELATED APPLICATIONS

This application claims the priority benefit of U.S. Patent Application 61/767,688 filed Feb. 21, 2013 entitled FUEL COMBUSTING METHOD, the entirety of which is incorporated by reference herein.

FIELD OF THE INVENTION

The present disclosure relates generally to low-emission power generation systems. More particularly, the present disclosure relates to systems and methods for changing the composition of components in exhaust gases from gas turbine systems.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

The combustion of fuel within a combustor, e.g., integrated with a gas turbine, can be controlled by monitoring the temperature of the exhaust gas. Under full load conditions, typical gas turbines adjust the amount of fuel introduced to a number of combustors in order to reach a desired combustion gas or exhaust gas temperature. Conventional combustion turbines control the oxidant introduced to the combustors using inlet guide vanes. Under partial load conditions, the amount of oxidant introduced to the combustor is reduced and the amount of fuel introduced is again controlled to reach the desired exhaust gas temperature. Further, at partial load, the efficiency of gas turbines drops because the ability to reduce the amount of oxidant is limited by the inlet guide vanes, which are only capable of slightly reducing the flow of oxidant. Further, the oxidant remains at a constant lower flow rate when the inlet guide vanes are in their flow restricting position. The efficiency of the gas turbine then drops when it is at lower power production because to make that amount of power with that mass flow a lower expander inlet temperature is required. Moreover, existing oxidant inlet control devices may not allow fine flow rate control and may introduce large pressure drops with any restriction on the oxidant flow. With either of these approaches to oxidant control, there are potential problems with lean blow out at partial load or reduced pressure operations.

Controlling the amount of oxidant introduced to the combustor can be desirable when an objective is to capture carbon dioxide ($CO_2$) from the exhaust gas. Current carbon dioxide capture technology is expensive due to several reasons. One reason is the low pressure and low concentration of carbon dioxide in the exhaust gas. The carbon dioxide concentration, however, can be significantly increased from about 4% to greater than 10% by operating the combustion process under substantially stoichiometric conditions. Further, a portion of the exhaust gas may be recycled to the combustor as a diluent in order to control the temperature of the gas within the combustor and of the exhaust gas. Also, any unused oxygen in the exhaust gas may be a contaminate in the captured carbon dioxide, restricting the type of solvents that can be utilized for the capture of carbon dioxide.

In many systems, an oxidant flow rate may be reduced by altering the operation of a separate oxidant system. For example, an independent oxidant compressor may be throttled back to a slower operating speed thereby providing a decreased oxidant flow rate. However, the reduction in compressor operating speed generally decreases the efficiency of the compressor. Additionally, throttling the compressor may reduce the pressure of the oxidant entering the combustor. In contrast, if the oxidant is provided by the compressor section of the gas turbine, reducing the speed is not a variable that is controllable during power generation. Large gas turbines that are used to produce 60 cycle power are generally run at 3600 rpm. Similarly, to produce 50 cycle power the gas turbine is often run at 3000 rpm. In conventional gas turbine combustor operations the flow of oxidant into the combustor may not warrant significant control because the excess oxidant is used as coolant in the combustion chamber to control the combustion conditions and the temperature of the exhaust gas. A number of studies have been performed to determine techniques for controlling combustion processes in gas turbines.

International Patent Application Publication No. WO/2010/044958 by Mittricker et al. discloses methods and systems for controlling the products of combustion, for example, in a gas turbine system. One embodiment includes a combustion control system having an oxygenation stream substantially comprising oxygen and $CO_2$ and having an oxygen to $CO_2$ ratio, then mixing the oxygenation stream with a combustion fuel stream and combusting in a combustor to generate a combustion products stream having a temperature and a composition detected by a temperature sensor and an oxygen analyzer, respectively. The data from the sensors are used to control the flow and composition of the oxygenation and combustion fuel streams. The system may also include a gas turbine with an expander and having a load and a load controller in a feedback arrangement.

International Patent Application Publication No. WO/2009/120779 by Mittricker et al. discloses systems and methods for low emission power generation and hydrocarbon recovery. One system includes integrated pressure maintenance and miscible flood systems with low emission power generation. Another system provides for low emission power generation, carbon sequestration, enhanced oil recovery (EOR), or carbon dioxide sales using a hot gas expander and external combustor. Another system provides for low emission power generation using a gas power turbine to compress air in the inlet compressor and generate power using hot carbon dioxide laden gas in the expander.

U.S. Pat. No. 4,858,428 to Paul discloses an advanced integrated propulsion system with total optimized cycle for gas turbine. Paul discloses a gas turbine system with integrated high and low pressure circuits having a power transmission for extracting work from one of the circuits, the volume of air and fuel to the respective circuits being varied according to the power demand monitored by a microprocessor. The turbine system has a low pressure compressor and a staged high pressure compressor with a combustion chamber and high pressure turbine associated with the high pressure compressor. A combustion chamber and a low pressure turbine are associated with the low pressure compressor, the low pressure turbine being staged with the high pressure turbine to additionally receive gases expended from the high pressure turbine and a microprocessor to regulate air and gas flows between the compressor and turbine components in the turbine system.

U.S. Pat. No. 4,271,664 to Earnest discloses a turbine engine with exhaust gas recirculation. The engine has a main power turbine operating on an open-loop Brayton cycle. The air supply to the main power turbine is furnished by a compressor independently driven by the turbine of a closed-loop Rankine cycle which derives heat energy from the exhaust of the Brayton turbine. A portion of the exhaust gas is recirculated into the compressor inlet during part-load operation.

U.S. Patent Application Publication No. 2009/0064653 by Hagen et al. discloses partial load combustion cycles. The part load method controls delivery of diluent fluid, fuel fluid, and oxidant fluid in thermodynamic cycles using diluent to increase the turbine inlet temperature and thermal efficiency in part load operation above that obtained by relevant art part load operation of Brayton cycles, fogged Brayton cycles, or cycles operating with some steam delivery, or with maximum steam delivery.

U.S. Pat. No. 5,355,668 to Weil et al. discloses a catalyst-bearing component of a gas turbine engine. Catalytic materials are formed on components in the gas flow path of the engine, reducing emissions of carbon monoxide and unburned hydrocarbons. The catalytic materials are selected from the noble metals and transition metal oxides. The portions of the gas flow path where such materials are applied can include the combustor, the turbine, and the exhaust system. The catalytic coating can be applied in conjunction with a thermal barrier coating system interposed between a substrate component and the catalytic coating.

While some past efforts to control the oxidant flow rate have implemented oxidant inlet control devices, such systems disclosed a control of all of the combustors together, failing to account for differences between combustors. Further, the systems were limited in their ability to finely tune the oxidant flow rate. As a result, the concentration of certain gases in the exhaust was higher than desirable.

SUMMARY

An exemplary embodiment of the present techniques provides a method for combusting a fuel in a gas turbine. The method includes providing a fuel to a combustor on a gas turbine, providing an oxidant to the combustor, and combusting the fuel and the oxidant in the combustor to produce an exhaust gas. At least a portion of the exhaust gas is passed through a water-gas shifting catalyst to form a low CO content product gas.

Another embodiment provides a gas turbine system. The gas turbine system includes an oxidant system, a fuel system, and a control system. A combustor is adapted to receive and combust an oxidant from the oxidant system and a fuel from the fuel system to produce an exhaust gas. A catalyst unit including a water gas shifting (WGS) catalyst is configured to reduce the concentration of carbon monoxide in the exhaust gas to form a low CO content product gas.

Another embodiment provides a heat recovery unit. The heat recovery unit includes a heat exchanger configured to remove heat energy from an exhaust gas, and a water gas shifting (WGS) catalyst bed configured to reduce a concentration of a target gas in the exhaust gas.

BRIEF DESCRIPTION OF THE DRAWINGS

The advantages of the present techniques are better understood by referring to the following detailed description and the attached drawings, in which.

DETAILED DESCRIPTION

Figure 1:
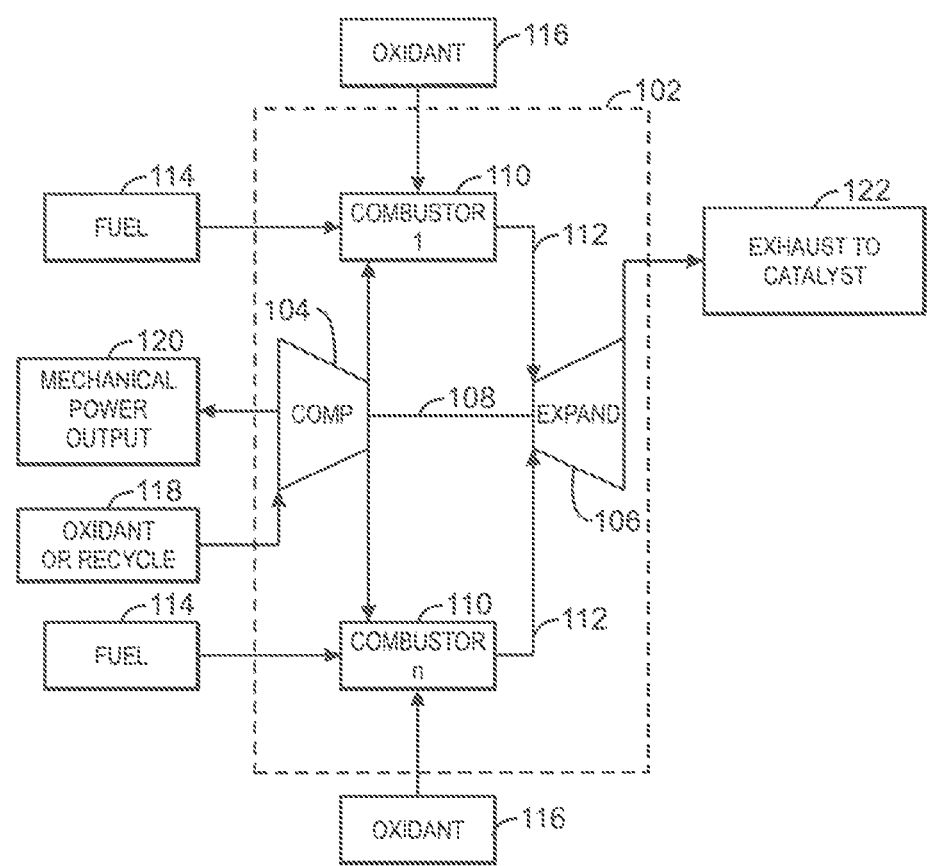
FIG. 1 is a schematic diagram of a gas turbine system that includes a gas turbine.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

A "combined cycle power plant" uses both steam and gas turbines to generate power. The gas turbine operates in an open or semi-open Brayton cycle, and the steam turbine operates in a Rankine cycle powered by the heat from the gas turbine. These combined cycle gas/steam power plants generally have a higher energy conversion efficiency than gas or steam only plants. A combined cycle plant's efficiencies can be as high as 50% to 60%. The higher combined cycle efficiencies result from synergistic utilization of a combination of the gas turbine with the steam turbine. Typically, combined cycle power plants utilize heat from the gas turbine exhaust to boil water to generate steam. The boilers in typical combined cycle plants can be referred to as heat recovery steam generator (HRSG). The steam generated is utilized to power a steam turbine in the combined cycle plant. The gas turbine and the steam turbine can be utilized to separately power independent generators, or in the alternative, the steam turbine can be combined with the gas turbine to jointly drive a single generator via a common drive shaft.

A diluent is a gas that is primarily used to reduce the combustor temperatures that result from the combustion of a fuel and oxidant. A diluent may be used to lower the concentration of oxidant or fuel (or both) that is fed to a gas turbine and/or to dilute the products of combustion. The diluent may be an excess of nitrogen, $CO_2$, combustion exhaust, or any number of other gases. In embodiments, a diluent may also provide cooling to a combustor and/or other parts of the gas turbine.

As used herein, a "compressor" includes any type of equipment designed to increase the pressure of a working fluid, and includes any one type or combination of similar or different types of compression equipment. A compressor may also include auxiliary equipment associated with the compressor, such as motors, and drive systems, among others.

The compressor may utilize one or more compression stages, for example, in series. Illustrative compressors may include, but are not limited to, positive displacement types, such as reciprocating and rotary compressors for example, and dynamic types, such as centrifugal and axial flow compressors, for example. For example, a compressor may be a first stage in a gas turbine engine, as discussed in further detail below.

A "control system" typically comprises one or more physical system components employing logic circuits that cooperate to achieve a set of common process results. In an operation of a gas turbine engine, the objectives can be to achieve a particular exhaust composition and temperature. The control system can be designed to reliably control the physical system components in the presence of external disturbances, variations among physical components due to manufacturing tolerances, and changes in inputted set-point values for controlled output values. Control systems usually have at least one measuring device, which provides a reading of a process variable, which can be fed to a controller, which then can provide a control signal to an actuator, which then drives a final control element acting on, for example, an oxidant stream. The control system can be designed to remain stable and avoid oscillations within a range of specific operating conditions. A well-designed control system can significantly reduce the need for human intervention, even during upset conditions in an operating process.

An "equivalence ratio" refers to the mass ratio of fuel to oxygen entering a combustor divided by the mass ratio of fuel to oxygen when the ratio is stoichiometric. A perfect combustion of fuel and oxygen to form $CO_2$ and water would have an equivalence ratio of 1. A too lean mixture, e.g., having more oxygen than fuel, would provide an equivalence ratio less than 1, while a too rich mixture, e.g., having more fuel than oxygen, would provide an equivalence ratio greater than 1.

A "fuel" includes any number of hydrocarbons that may be combusted with an oxidant to power a gas turbine. Such hydrocarbons may include natural gas, treated natural gas, kerosene, gasoline, or any number of other natural or synthetic hydrocarbons.

A "gas turbine" engine operates on the Brayton cycle. If the exhaust gas is vented, this is termed an open Brayton cycle, while recycling at least a portion of the exhaust gas gives a semi-open Brayton cycle. In a semi-open Brayton cycle, at least fuel and oxidant are added to the system to support internal combustion and a portion of the products of combustion are vented or extracted. In a closed Brayton cycle, all of the exhaust is recycled and none is vented or extracted and heat is added to the system by external combustion or another means. As used herein, a gas turbine typically includes a compressor section, a number of combustors, and a turbine expander section. The compressor may be used to compress an oxidant, which is mixed with a fuel and channeled to the combustors. The mixture of fuel and oxidant is then ignited to generate hot combustion gases. The combustion gases are channeled to the turbine expander section which extracts energy from the combustion gases for powering the compressor, as well as producing useful work to power a load. In embodiments discussed herein, the oxidant may be provided to the combustors by an external compressor, which may or may not be mechanically linked to the shaft of the gas turbine engine. Further, in embodiments, the compressor section may be used to compress a diluent, such as recycled exhaust gases, which may be fed to the combustors as a coolant.

A "heat recovery steam generator" or HRSG is a heat exchanger or boiler that recovers heat from a hot gas stream. It produces steam that can be used in a process or used to drive a steam turbine. A common application for an HRSG is in a combined-cycle power plant, where hot exhaust from a gas turbine is fed to the HRSG to generate steam which in turn drives a steam turbine. This combination produces electricity more efficiently than either the gas turbine or steam turbine alone. As used herein, an HRSG may include any number of heat recovery units in addition to, or instead of, an HRSG by itself.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in raw natural gas, such as $CH_4$, $C_2H_2$, $C_2H_4$, $C_2H_6$, $C_3$ isomers, $C_4$ isomers, benzene, and the like.

An "oxidant" is a gas mixture that can be flowed into the combustors of a gas turbine engine to combust a fuel. As used herein, the oxidant may be oxygen mixed with any number of other gases as diluents, including $CO_2$, $N_2$, air, combustion exhaust, and the like.

A "sensor" refers to any device that can detect, determine, monitor, record, or otherwise sense the absolute value of or a change in a physical quantity. A sensor as described herein can be used to measure physical quantities including, temperature, pressure, $O_2$ concentration, CO concentration, $CO_2$ concentration, flow rate, acoustic data, vibration data, chemical concentration, valve positions, or any other physical data.

"Pressure" is the force exerted per unit area by the gas on the walls of the volume. Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gage pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

Overview

Embodiments of the present invention provide a system and a method for consuming carbon monoxide generated in the combustion in a gas turbine engine. This is performed by a water gas shift reaction, for example, in a catalyst bed located in a heat-recovery steam generator (HRSG). The water gas shift reaction is a chemical reaction between carbon monoxide and water vapor that forms carbon dioxide and hydrogen as products. The water-gas shift reaction is a predominant reaction given the relatively large quantity of water vapor present in the exhaust from the gas turbine. In some embodiments, such as in a stoichiometric exhaust gas recirculation (SEGR) gas turbine, the exhaust is a recirculated low oxygen content gas stream, which is used at least as a coolant gas in the combustors. Typically, water vapor content of more than 10 volume percent (>100 k parts per million volume, ppmv) is present in the recirculated low oxygen content gas stream while oxygen, carbon monoxide and hydrogen are of the order of 1000 to 5000 ppmv. As a result, the water-gas shift reaction is able to consume residual carbon monoxide plus a similar quantity of water vapor to create carbon dioxide and hydrogen at a higher conversion efficiency than the competing oxidation reactions. The resulting low CO content product gas may comprise as little as 1 or 2 ppm CO.

A moderate conversion efficiency may be acceptable, since the high concentration of water vapor relative to the concentration of carbon monoxide will still tend to force a high conversion. The catalyst bed may be located in a moderate temperature zone of the HRSG, e.g., in a zone of about 150° C. to about 250° C. or 100° C. to 400° C., since lower temperature zones of the HRSG are well suited for catalyst systems designed for a water-gas shift reaction. Hydrogen formed in the reaction will likely have a very low conversion efficiency to oxidization to water vapor. Accordingly, the hydrogen may be recirculated within the recirculated low oxygen content gas stream to the compressor section of the SEGR gas turbine and then may either be extracted as part of the product stream, used as part of the sealing and cooling stream of the gas turbine hot gas path or transit to the combustor where this hydrogen should be largely oxidized within the combustors. The hydrogen part extracted as part of the product stream should be easily oxidized to water vapor within the first oxidation catalyst unit included within the product extraction circuit. Overall, this arrangement should provide improved conversion efficiency.

In some embodiments described herein, an oxidation catalyst is used in a hot zone of the HRSG to oxidize carbon monoxide, hydrogen, and unburned hydrocarbons with residual oxygen from the gas turbine exhaust, forming carbon dioxide and water. A moderate oxidizing conversion efficiency may be accepted in order to provide a low pressure drop across a catalyst bed.

Sensors may be placed in the exhaust gas, the product gas, or both to adjust the combustion conditions to control the amount of CO, oxygen or other contaminants in the exhaust gas. For example, the sensors may be located in a ring on an expander exhaust, an inlet to the catalyst bed, an outlet from a catalyst bed, or any combination. The sensors may include lambda sensors, oxygen sensors, carbon monoxide sensors, and temperature sensors, among others. Further, combinations of different types of sensors may be used to provide further information.

In some embodiments, multiple sensors may be used to adjust the conditions in individual combustors on the gas turbine. The sensors may not have a one-to-one relationship to particular combustors, but may be influenced by a particular combustor. The response of various sensors may be related back to a particular combustor, for example, using sum and difference algorithms that may be based on swirl charts. Swirl charts relate patterns of exhaust flow in an expander to combustors that may have contributed to the exhaust flow at that point.

The use of individually controlled combustors may increase the burn efficiency of a gas turbine engine, e.g., making the burn closer to a one-to-one equivalence ratio. Such improvements in efficiency may lower $O_2$, unburned hydrocarbons, and carbon monoxide in the exhaust. This may make the use of an oxidation catalyst more problematic, as both reactants are present in small amounts. However, the large amount of water vapor in the exhaust can maintain a high rate of conversion of the CO in the water gas shift reaction.

FIG. 1 is a schematic diagram of a gas turbine system 100 that includes a gas turbine engine 102. The gas turbine engine 102 may have a compressor 104 and a turbine expander 106 on a single shaft 108. The gas turbine engine 102 is not limited to a single shaft arrangement, as multiple shafts could be used, generally with mechanical linkages or transmissions between shafts. In various embodiments, the gas turbine engine 102 also has a number of combustors 110 that feed hot exhaust gas to the expander, for example, through lines 112. For example, a gas turbine 102 may have 2, 4, 6, 14, 18, or even more combustors 110, depending on the size of the gas turbine 102.

The combustors 110 are used to burn a fuel provided by a fuel source 114. An oxidant may be provided to each of the combustors 110 from various sources. For example, in embodiments, an external oxidant source 116, such as an external compressor, may provide the oxidant to the combustors 110. In embodiments, an oxidant or recycled exhaust gases 118, or a mixture thereof, may be compressed in the compressor 104 and then provided to the combustors 110. In other embodiments, such as when an external oxidant source 116 is provided, the compressor 104 may be used to compress only the recycled exhaust gas, which may be fed to the combustors 110 for cooling and dilution of the oxidant.

The exhaust gas from the combustors 110 expands in the turbine expander 106, creating mechanical energy. The mechanical energy may power the compressor 104 through the shaft 108. Further, a portion of the mechanical energy may be harvested from the gas turbine as a mechanical power output 120, for example, to generate electricity or to power oxidant compressors. The expanded exhaust gas 122 may be vented, used for heat recovery, recycled to the compressor 104, or used in any combinations thereof. In an embodiment, the exhaust gas 122 is flowed through one or more catalyst beds that include a water gas shift catalyst, and oxidation catalyst, or both.

In some embodiments, the oxidant is metered to the combustors 110 to control an equivalence ratio of the fuel to the oxidant. The metering may be performed for all combustors 110 together, for example, by adjusting the fuel 114 and oxidant 116 sources, or each individual combustor 110. It will be apparent to one of skill in the art that a stoichiometric burn, e.g., at an equivalence ratio of 1, will be hotter than a non-stoichiometric burn. Therefore, either excess oxidant or an added non-combustible gas, such as a recycle exhaust gas, can be added to cool the engine, preventing damage to the combustors 110 or the turbine expander 106 from the extreme heat.

The use of recycled exhaust gas 122 provides a further advantage in that the exhaust is deficient in oxygen, making it a better material for enhanced oil recovery. Adjusting individual combustors 110 may compensate for differences between the combustors 110, improving the overall efficiency of the gas turbine 102.

Control of Combustors

Figure 2:
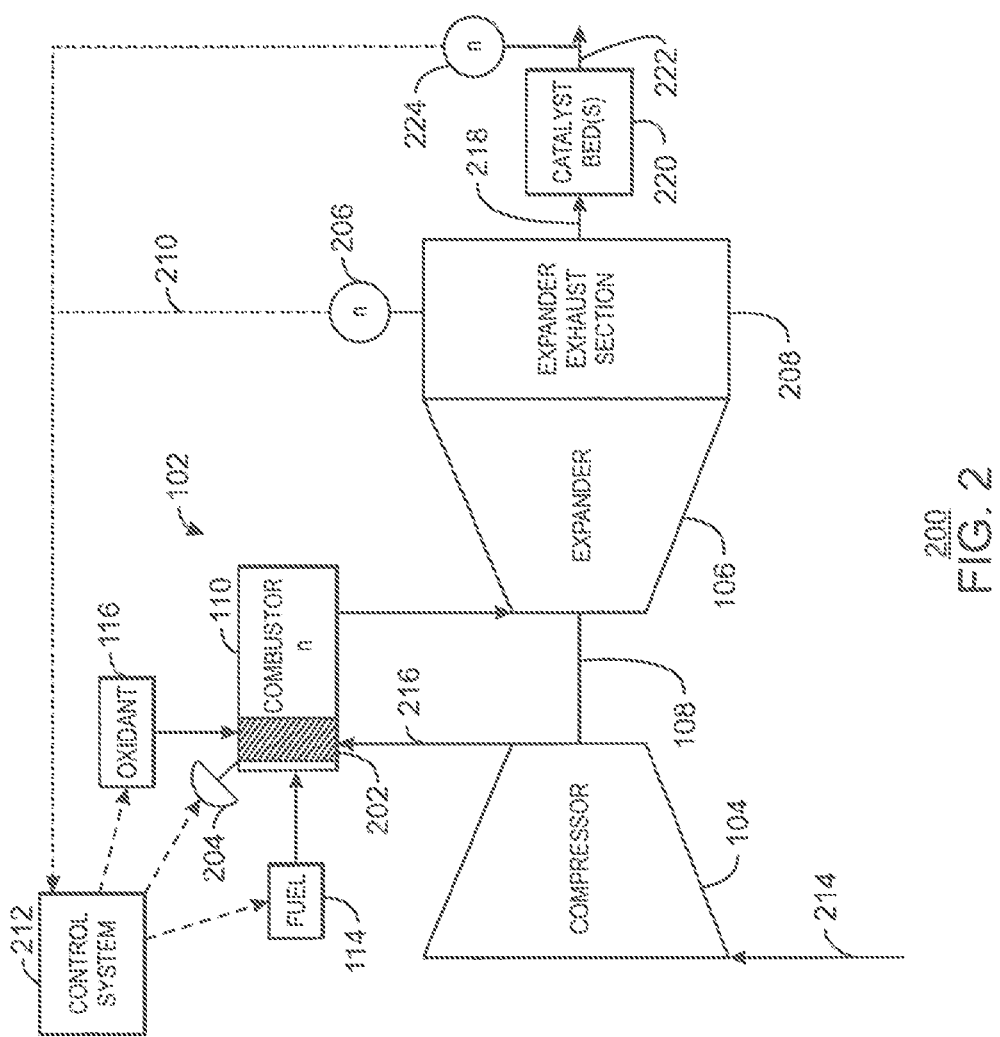
FIG. 2 is a schematic of a gas turbine system that can be used to adjust the fuel and the oxidant flow to the combustors of a gas turbine engine.

FIG. 2 is a schematic of a gas turbine system 200 that can be used to adjust the oxidant flow and/or fuel flow to the combustors 110 of a gas turbine engine 102. The referenced units are as generally discussed with respect to FIG. 1. The system 200 may adjust the amount of oxidant 116 provided to the combustors 110, for example, by adjusting the pressure, flow rate, or composition of the oxidant 116. Similarly, the system 200 may adjust the amount of fuel 114 provided to the combustors 110 by adjusting the pressure, flow rate, or composition of the fuel 114. In an embodiment, the oxidant flow to each individual combustor 110 may be adjusted by an oxidant flow adjusting device 202, such as a valve, swirler, or mixing section in each combustor 110. An actuator 204 can be used to adjust the oxidant flow adjusting device 202. Similarly, the fuel flow 114 to each individual combustor 110 may be adjusted.

A number of sensors 206 can be placed in an expander exhaust section 208 of the gas turbine engine 102, for example, 5, 10, 15, 20, 25, 30 or more, sensors 206 may be placed in a ring around the expander exhaust section 208. The number of sensors 206 may be determined by the size of the gas turbine 102, the number of combustors 110, or both. The sensors 206 may include oxygen sensors, carbon monoxide sensors, temperature sensors, hydrogen sensors, and the like. Examples of oxygen sensors can include lambda and/or wideband zirconia-oxygen sensors, titania sensors, galvanic, infrared, or any combination thereof. Examples of temperature sensors can include thermocouples, resistive temperature devices, infrared sensors, or any combination thereof. Examples of carbon monoxide sensors can include oxide based film sensors such as barium stannate and/or titanium dioxide. For example, a carbon monoxide sensor can include platinum-activated titanium dioxide, lanthanum stabilized titanium dioxide, and the like. The choice of the sensors 206 may be controlled by the response time, as the measurements are needed for real time control of the system. The sensors 206 may also include combinations of different types of sensors 206. The sensors 206 send a signal 210 back to the control system 212, which may be used to make fuel and oxidant adjustment decisions for each, or all, of the combustors 110. Any number of physical measurements could be performed, for example, the sensors 206 could be used to measure temperature, pressure, CO concentration, $O_2$ concentration, vibration, and the like. Further, multiple sensors 206 could be used to measure combinations of these parameters.

The control system 212 may be part of a larger system, such as a distributed control system (DCS), a programmable logic controller (PLC), a direct digital controller (DDC), or any other appropriate control system. Further, the control system 212 may automatically adjust parameters, or may provide information about the gas turbine 102 to an operator who manually performs adjustments. The control system 212 is discussed further with respect to FIG. 7, below.

It will be understood that the gas turbine system 200 shown in FIG. 2, and similar gas turbine systems depicted in other figures, have been simplified to assist in explaining various embodiments of the present techniques. Accordingly, in embodiments of the present techniques, both the oxidant system 116 and the fuel system 114, as well as the gas turbine systems themselves, can include numerous devices not shown. Such devices can include flow meters, such as orifice flow meters, mass flow meters, ultrasonic flow meters, venturi flow meters, and the like. Other devices can include valves, such as piston motor valves (PMVs) to open and close lines, and motor valves, such as diaphragm motor valves (DMVs), globe valves, and the like, to regulate flow rates. Further, compressors, tanks, heat exchangers, and sensors may be utilized in embodiments in addition to the units shown.

In the embodiment shown in FIG. 2, the compressor 104 may be used to compress a stream 214, such as a recycled exhaust stream. After compression, the stream 214 may be injected from a line 216 into the mixing section of the combustor 110. The stream 214 is not limited to a pure recycle stream, as the injected stream 216 may provide the oxidant to the combustor 110. The exhaust stream 218 from the expander exhaust section 208 may be used to provide the recycle stream, as discussed further with respect to FIG. 2, below.

Catalysts and Catalyst Beds

The exhaust stream 218 may be passed through one or more catalyst beds 220, for example, attached to the exhaust expander section 208, located in an HRSG, or in other places in the gas turbine system 200. The catalyst beds 220 may comprise any number of catalyst components. For example, a catalyst bed may comprise an oxidation catalyst or a water gas shift catalyst. Multiple catalyst beds may be used in sequence. Generally, an oxidation and/or reduction catalyst bed may be located in a high temperature zone, for example, in an exhaust expander section 208, in separate catalyst bed 220 after the exhaust expander 208, or in early stage of a heat recovery steam generator (HRSG), as discussed herein. A water gas shift catalyst bed may be located in a lower temperature region of the exhaust flow, such as towards the end of an HRSG. The product gas 222 from the catalyst bed 220 may be a low oxygen content gas that substantially includes carbon dioxide, nitrogen, argon, hydrogen, and water vapor. Small amounts of carbon monoxide may still be present, but may be less than about 5 ppmv, for example, 2 ppmv or 1 ppmv.

It can be noted that the catalyst bed 220 is not limited to oxidation catalysts, but may also include other catalysts that can reduce chemical components. For example, the catalyst bed 220 may comprise a catalytic convertor, in which an oxidation catalyst oxidizes CO and unburned hydrocarbons to $CO_2$ and $H_2O$, and a reduction catalyst converts oxides of nitrogen ($NO_x$) to $N_2$, $CO_2$, and $H_2O$. The oxidation catalyst may be, for example, platinum, palladium, gold, or other metals, supported on a refractory oxide. The refractory oxide may include alumina, silica, titania, zirconia, or mixtures thereof. The reduction catalyst may include, for example, rhodium, or other metals. Additional metals that may be used in the catalyst bed 220 include nickel, cerium, iron, manganese, and copper, among others.

The water gas shift (WGS) reaction converts the reagents CO and $H_2O$ to $CO_2$ and $H_2$. Any number of WGS catalysts can be used for this reaction, and placed in temperature regions of the HRSG at which the WSG catalyst is most active. For example, an iron-chromium oxide catalyst supported on a refractory oxide, such as alumina, silica, titania, zirconia, or mixtures thereof, may be used in a region that is in a temperature range of about 300° C. to about 450° C. Further, a copper-zinc catalyst support on a refractory oxide may be used in a region that is in a temperature range of about 180° C. to about 270° C. Any number of other WGS catalysts may be used, including, for example, a platinum-rhenium catalyst, or catalyst combinations of ruthenium with copper or rhenium.

The refractory oxides supporting the catalytic metal may be held in place by a honeycombed ceramic structure that is designed to allow flow of the exhaust gas with minimal back pressure. In an HRSG, the refractory oxide holding the catalytic metal may be supported on a ceramic that is supported on heat exchanger tubes configured to control the reaction temperature.

The sensors 206 are not limited to the expander exhaust section 208, but may be in any number of other locations, instead of or in addition to the expander exhaust section 208. For example, the sensors 206 may be disposed in multiple rings around the expander exhaust section 208. Further, the sensors 206 may be separated into multiple rings by the type of sensor 206, for example, with oxygen analyzers in one ring and temperature sensors in another ring. Sensors 224 may also be located in the product gas stream 222 from the catalyst bed 220.

In embodiments the gas turbine engine 102 may be used to provide power, $CO_2$, heat energy, or any combinations thereof for numerous applications. For example, the product gas 222 from the catalyst bed 220 may be processed in a dehydration unit, such as a cryogenic dehydration system, a glycol system, or a combination system, to form a low dewpoint gas, e.g., with a dewpoint less than about −10° C., less than about −30° C., less than about −50° C., or lower. Further, the product gas 222 may be processed in a carbon dioxide separation unit to produce a lean carbon dioxide stream and a rich carbon dioxide stream. The carbon dioxide separation unit may include solid absorption columns, cryogenic separation systems, liquid adsorption systems, or chemical sorption systems.

Either the lean carbon dioxide stream or the rich carbon dioxide stream may be injected into a subterranean reservoir for enhanced hydrocarbon recovery. The rich carbon dioxide stream may be injected into a carbon sequestration well, while the lean carbon dioxide stream may be provided as a gaseous product to market. The lean carbon dioxide stream may be processed in a dehydration unit to lower the dewpoint prior to sales. If sale of the lean carbon dioxide stream is not desirable, the stream may be passed through an expander to recovery mechanical energy prior to venting the stream.

Energy Recovery and Recycle of Exhaust

Figure 3:
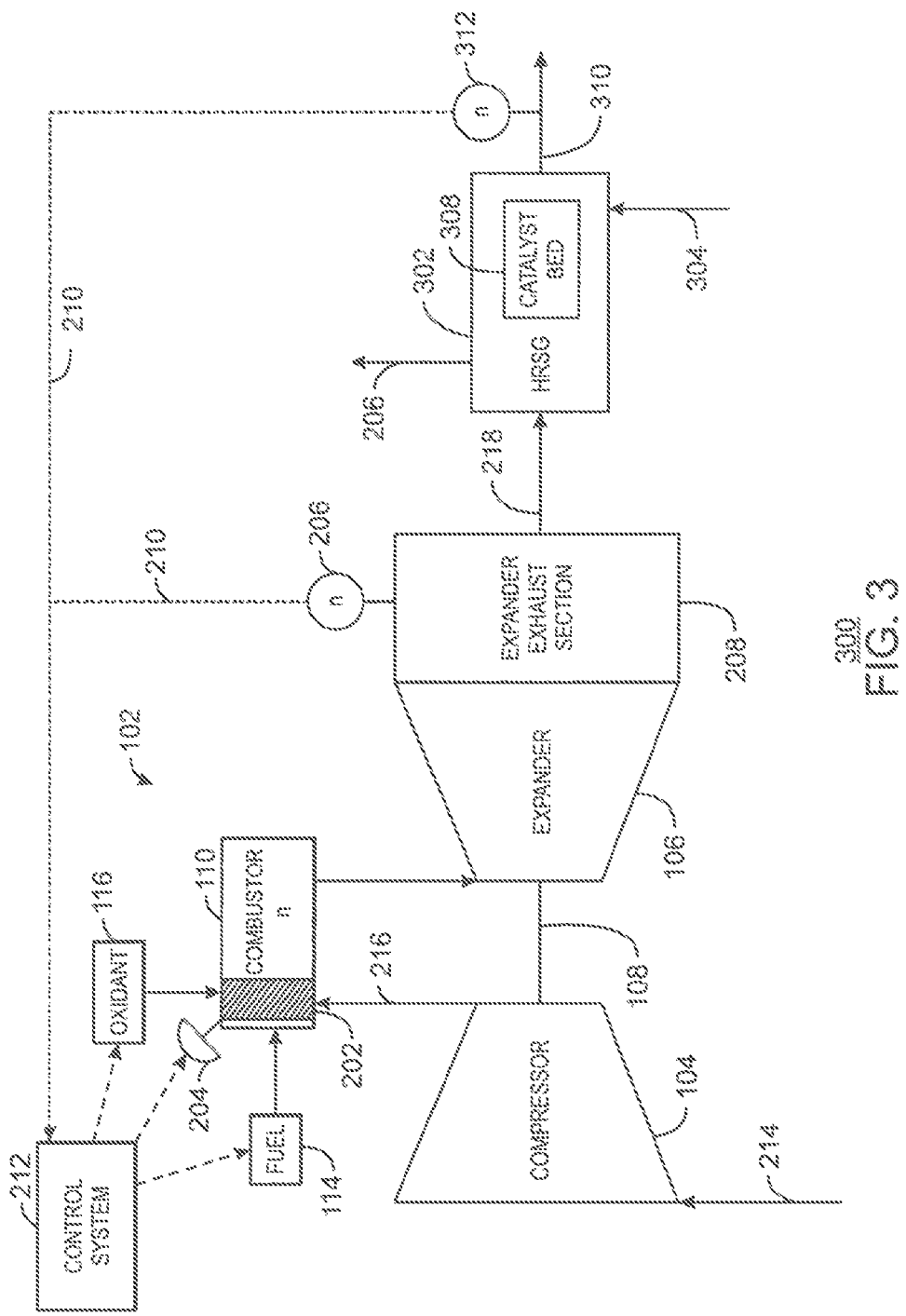
FIG. 3 is a schematic of a gas turbine system that includes an HRSG on the exhaust stream from the expander exhaust section.

FIG. 3 is a schematic of a gas turbine system 300 that includes an HRSG 302 on the exhaust stream 218 from the expander exhaust section 208. The HRSG 302 may include any number of heat recovery units, such as a steam superheating device, a steam raising device, a feed water heating device, or an endothermic reaction device, among others. Thus, any HRSG 302 referred to herein may be replaced with any other type of heat recovery unit. Like numbered items are as described above with respect to FIGS. 1 and 2. The exhaust gas in the exhaust stream 218 can include, but is not limited to, unburned fuel, oxygen, carbon monoxide, carbon dioxide, hydrogen, nitrogen, nitrogen oxides, argon, water, steam, or any combinations thereof. The exhaust stream 218 can have a temperature ranging from about 430° C. to about 725° C. and a pressure of about 101 kPa to about 110 kPa.

In the embodiment shown in the schematic, the heat generated by the combustion can be used to boil an inlet water stream 304 to generate a steam stream 306 that may also be superheated. The steam stream 306 may be used, for example, in a Rankine cycle to generate mechanical power from a steam turbine, or to provide steam for utilities, or both. The mechanical power from the steam turbine may be used to generate electricity, operate compressors, and the like. As noted herein, the gas turbine system 300 is not limited to a HRSG 302, as any type of heat recovery unit (HRU) may be used. For example, the heat may be recovered in a heat exchanger to provide hot water or other heated fluids. Further, a Rankine cycle based on an organic working fluid (ORC) may be used to recover heat energy by converting it to mechanical energy.

In an embodiment, one or more catalyst beds 308 may be located in the HRSG 302 and described herein. The catalyst beds 308 may be located within the HRSG 302 by the reaction temperature desired for the catalyst. For example, a catalyst that operates at a higher temperature, such as an oxidation catalyst, may be located in the HRSG 302 at a point just after the exhaust stream 218 enters the HRSG 302. Similarly, a catalyst that operates at a lower temperature may be located at a later point in the HRSG 302, for example, just before a product gas 310 leaves the HRSG 302.

The cooled exhaust stream or product gas 310 may then be used for other purposes, such as to provide recycle gas for stream 214. Various other sensors may be added to the system to monitor and control the catalytic reaction. For example, sensors 312 may be placed in the product gas 310 to determine the efficacy of the catalytic reactions. These sensors 312 may be used in addition to the sensors 206 on the expander exhaust section 208 to determine the reactants present, and to control the fuel and oxidant levels.

Individual Control of Equivalence Ratio to Combustors

The gas turbine systems discussed above may be used to control the combustion process in the combustors 110, either individually, as a group, or both. A goal of the control may be to balance the equivalence ratio of the fuel and oxygen. This may be performed to minimize unburned or partially burned hydrocarbon, represented by the CO concentration in an exhaust stream and to minimize unconsumed oxygen in the exhaust stream. The equivalence ratio is discussed further with respect to FIG. 4A.

Figure 4A:
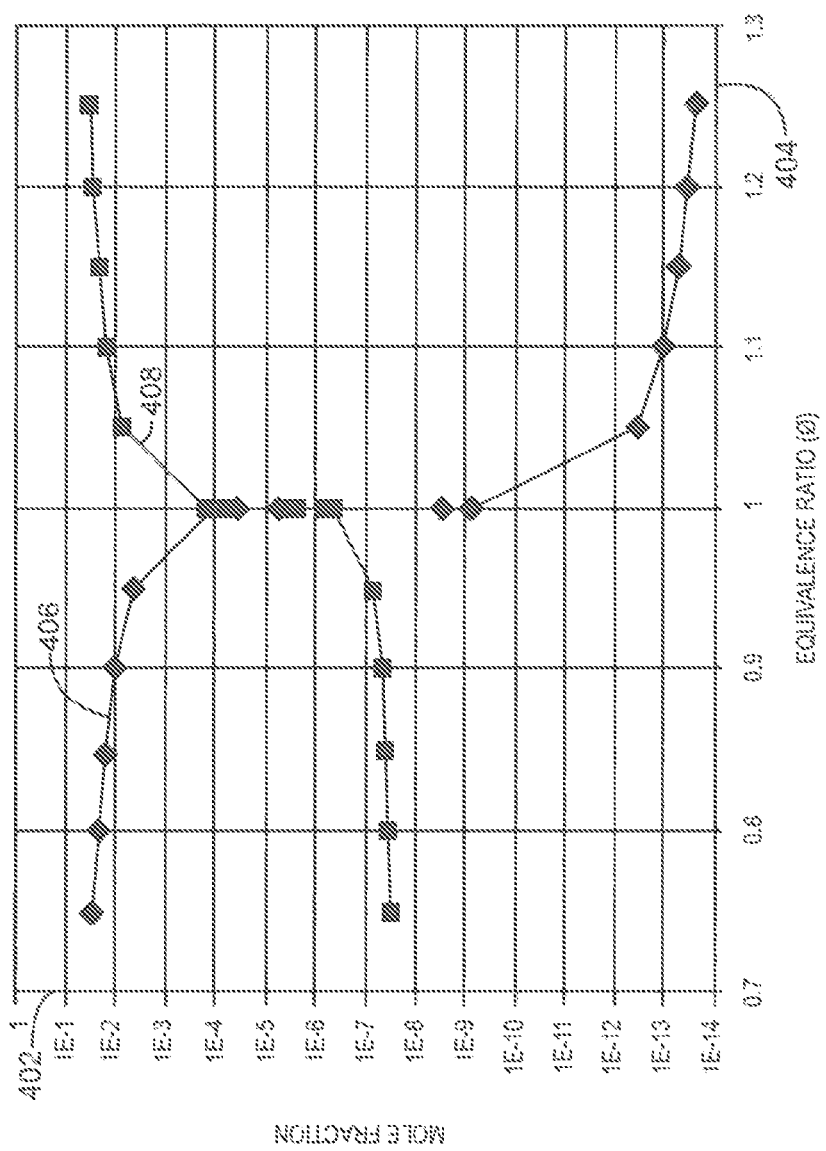
FIGS. 4A and 4B are graphical depictions of a simulation showing the relationship between the concentration of oxygen and carbon monoxide as the equivalence ratio ($\varphi$) changes from 0.75 to 1.25 and from 0.999 to 1.001, respectively.
Figure 4B:
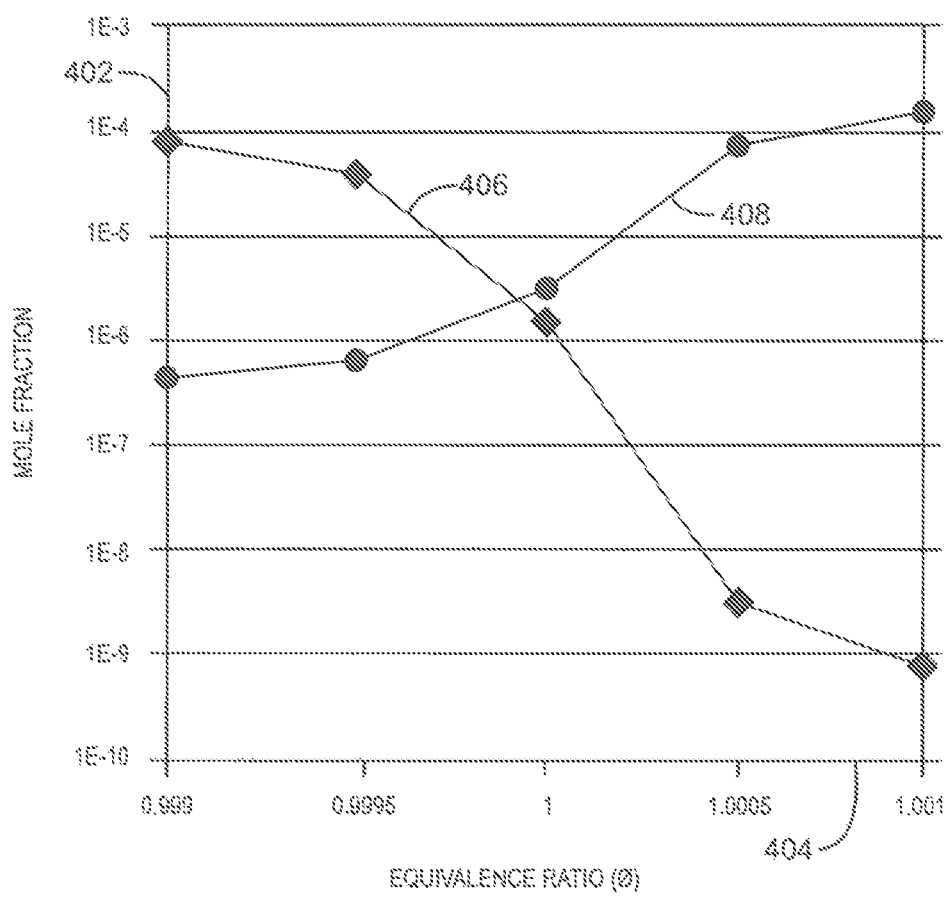

FIGS. 4A and 4B are graphical depictions of a simulation showing the equilibrium relationship between the mole fraction 402 of oxygen and carbon monoxide as the equivalence ratio ($\varphi$) 404 changes from 0.75 to 1.25 and from 0.999 to 1.001, respectively. The highest efficiency may be achieved when the equivalence ratio is about 1.0. The oxygen concentration as a function of the equivalence ratio is shown as line 406 and the carbon monoxide concentration as a function of the equivalence ration is shown as line 408. The equivalence ratio ($\varphi$) 404 is equal to (mol % fuel/mol % oxygen)$_{actual}$/(mol % fuel/mol % oxygen)$_{stoichiometric}$. The mol % fuel is equal to $F_{fuel}/(F_{oxygen}+F_{fuel})$, where $F_{fuel}$ is equal to the molar flow rate of fuel and $F_{oxygen}$ is equal to the molar flow rate of oxygen.

The mol % oxygen is equal to $F_{oxygen}/(F_{oxygen}+F_{fuel})$, where $F_{oxygen}$ is equal to the molar flow rate of oxygen and $F_{fuel}$ is equal to the molar flow rate of fuel. The molar flow rate of the oxygen depends on the proportion of oxygen to diluent in the oxidant mixture, and may be calculated as $F_{oxygen}/(F_{oxygen}+F_{diluent})$. As used herein, the flow rate of the oxidant may be calculated as $F_{oxidant}=(F_{oxygen}/F_{diluent})$.

As the equivalence ratio ($\varphi$) 404 goes below 1 or above 1 the mole fraction or concentration of oxygen and carbon dioxide in the exhaust gas changes. For example, as the equivalence ratio ($\varphi$) 404 goes below 1 the mole fraction of oxygen rapidly increases from about 1 ppm (i.e., an oxygen mole fraction of about $1.0\times10^{-6}$) at an equivalence ratio ($\varphi$) 404 of about 1 to about 100 ppm (i.e., an oxygen mole fraction of about $1\times10^{-4}$) at an equivalence ratio ($\varphi$) 404 of about 0.999. Similarly, as the equivalence ratio ($\varphi$) 404 goes above 1 the concentration of carbon monoxide rapidly increase from about 1 ppm (i.e., carbon monoxide mole fraction of about $1 \times 10^{-6}$) at an equivalence ratio ($\varphi$) 404 of about 0.9995 to greater than about 100 ppm (i.e., a carbon monoxide mole fraction of about $1 \times 10^{-4}$) at an equivalence ratio ($\varphi$) 404 of about 1.001.

Based, at least in part, on the data obtained from the sensors, such as sensors 206 (FIG. 2), or 312 (FIG. 3), the amount of oxidant 116 and/or the amount of fuel 114 the combustors 110 can be adjusted to produce an exhaust stream 218 having a desired composition. For example, monitoring the oxygen and/or carbon monoxide concentration in the exhaust gas in the expander exhaust section 208 or the cooled exhaust stream 310 allows the adjustment of the amount of oxidant 116 and fuel 114 introduced the combustors 110, either individual or as an ensemble, to be controlled such that combustion of the fuel 114 is carried out within a predetermined range of equivalence ratios ($\varphi$) 404 in the gas turbine engine 102. This can be used to produce an exhaust stream 218 having a combined concentration of oxygen and carbon monoxide of less than about 3 mol %, less than about 2.5 mol %, less than about 2 mol %, less than about 1.5 mol %, less than about 1 mol %, or less than about 0.5 mol %. Furthermore, the exhaust stream 218 may have less than about 4,000 ppm, less than about 2,000 ppm, less than about 1,000 ppm, less than about 500 ppm, less than about 250 ppm, or less than about 100 ppm combined oxygen and carbon monoxide. In some embodiments, the fuel 114 and oxidant 116 are adjusted to form a slightly rich mixture to enhance the formation of CO at the expense of the $O_2$, favoring the water gas shift reaction. In other embodiments, a slightly lean mixture is formed, to enhance the formation of $O_2$ at the expense of CO and unburned hydrocarbons, favoring an oxidation reaction. However, as the exhaust will contain a much higher content of water vapor, for example, at about 10,000 ppm or higher, than any other reactive component, the water gas shift reaction may more favorable.

A desired or predetermined range for the equivalence ratio ($\varphi$) 404 in the combustors 110 can be calculated or entered to carry out the combustion of the fuel 114 to produce an mixed exhaust stream 418 containing a desired amount of oxygen and/or carbon monoxide. For example, the equivalence ratio ($\varphi$) in the combustors 110 can be maintained within a predetermined range of from about 0.85 to about 1.15 to produce an exhaust stream 218 having a combined oxygen and carbon monoxide concentration ranging from a low of about 0.5 mol %, about 0.8 mol %, or about 1 mol %, to a high of about 1.5 mol %, about 1.8 mol %, about 2 mol %, or about 2.2 mol %. In another example, the equivalence ratio ($\varphi$) 404 in the combustors 110 can be maintained within a range of about 0.85 to about 1.15 to produce an exhaust stream 218 having a combined oxygen and carbon monoxide concentration of less than 2 mol %, less than about 1.9 mol %, less than about 1.7 mol %, less than about 1.4 mol %, less than about 1.2 mol %, or less than about 1 mol %. In still another example, the equivalence ratio ($\varphi$) 404 in the combustors 110 can be maintained within a range of from about 0.96 to about 1.04 to produce an exhaust stream 218 having a combined oxygen and carbon monoxide concentration of less than about 4,000 ppm, less than about 3,000 ppm, less than about 2,000 ppm, less than about 1,000 ppm, less than about 500 ppm, less than about 250 ppm, or less than about 100 ppm.

It will be noted that in embodiments in which the combustors 110 are individually controlled, the combustors 110 do not have to be at the same set-point, or even within the same range. In various embodiment, different or biased set-points may be used for each of the combustors 110 to account for differences in construction, performance, or operation. This may avoid a situation in which different operational characteristics of different combustors 110 cause the exhaust stream 218 to be contaminated with unacceptable levels of oxygen or carbon monoxide. Also, it will be noted that a combination of combustion efficiency less that 100% and equivalence ratio differences among the individual combustors 110 may result in both CO 408 and oxygen 406 levels greater than those shown in FIGS. 4A and 4B at a given global equivalence ratio 404.

Accordingly, in embodiments of the present techniques, two methods for operating the gas turbine 102 are used. In a first method, the entire set of combustors 110 is operated as a single entity, for example, during startup and in response to global set-point adjustments, such as speed or power changes. In a second method, the individual combustors 110 may be separately biased, for example, to compensate for differences in wear, manufacturing, and the like.

One method for operating the entire set of combustors 110 can include initially, i.e., on start-up, introducing the fuel 114 and oxygen in the oxidant 116 at an equivalence ratio ($\varphi$) 404 greater than 1. For example, the equivalence ratio ($\varphi$) 404 at startup may range from a low of about 1.0001, about 1.0005, about 1.001, about 1.05, or about 1.1, to a high of about 1.1, about 1.2, about 1.3, about 1.4, or about 1.5. In another example, the equivalence ratio ($\varphi$) 404 can range from about 1.0001 to about 1.1, from about 1.0005 to about 1.01, from about 1.0007 to about 1.005, or from about 1.01 to about 1.1. For global adjustments, the concentration of oxygen and/or carbon monoxide in the exhaust stream 218 can be determined or estimated via the sensors 206, 224, or 312. The expanded exhaust gas in the exhaust stream 218 may initially have a high concentration of carbon monoxide (e.g., greater than about 1,000 ppm or greater than about 10,000 ppm) and a low concentration of oxygen (e.g., less than about 10 ppm or less than about 1 ppm).

Another method for operating the entire set of combustors 110 can include initially, i.e., on start-up, introducing the fuel 114 and oxygen in the oxidant 116 at an equivalence ratio ($\varphi$) 404 of less than 1. For example, the equivalence ratio ($\varphi$) 404 at startup may range from a low of about 0.5, about 0.6, about 0.7, about 0.8, or about 0.9 to a high of about 0.95, about 0.98, about 0.99, about 0.999. In another example, the equivalence ratio ($\varphi$) 404 can range from about 0.9 to about 0.999 from about 0.95 to about 0.99, from about 0.96 to about 0.99, or from about 0.97 to about 0.99. The expanded exhaust gas in the exhaust stream 218 may initially have a high concentration of oxygen (e.g., greater than about 1,000 ppm or greater than about 10,000 ppm) and a low concentration of carbon monoxide (e.g., less than about 10 ppm or even less than about 1 ppm).

For example, when the concentration of oxygen in the exhaust gas increases from less than about 1 ppm to greater than about 100 ppm, about 1,000 ppm, about 1 mol %, about 2 mol %, about 3 mol %, or about 4 mol %, an operator, the control system 212, or both can be alerted that an equivalence ratio ($\varphi$) 404 of less than 1 has been reached. In one or more embodiments, the amount of oxygen via oxidant 116 and fuel 114 can be maintained constant or substantially constant to provide a combustion process having an equivalence ratio ($\varphi$) 404 of slightly less than 1, e.g., about 0.99. The amount of oxygen via oxidant 116 can be decreased and/or the amount of fuel 114 can be increased and then maintained at a constant or substantially constant amount to provide a combustion process having an equivalence ratio ($\varphi$) 404 falling within a predetermined range. For example, when the concentration of oxygen in the exhaust stream 418 increases from less than about 1 ppm to about 1,000 ppm, about 0.5 mol %, about 2 mol %, or about 4 mol %, the amount of oxygen introduced via the oxidant 116 can be reduced by an amount ranging from a low of about 0.01%, about 0.02%, about 0.03%, or about 0.04% to a high of about 1%, about 2%, about 3%, or about 5% relative to the amount of oxygen introduced via the oxidant 116 at the time the increase in oxygen in the exhaust gas is initially detected. In another example, when the concentration of oxygen in the exhaust stream 218 increases from less than about 1 ppm to about 1,000 ppm or more the amount of oxygen introduced via the oxidant 116 can be reduced by about 0.01% to about 2%, about 0.03% to about 1%, or about 0.05% to about 0.5% relative to the amount of oxygen introduced via the oxidant 116 at the time the increase in oxygen in the exhaust gas is detected. In still another example, when the concentration of oxygen increases from less than about 1 ppm to about 1,000 ppm or more the amount of fuel 114 can be increased by an amount ranging from a low of about 0.01%, about 0.02%, about 0.03%, or about 0.04% to a high of about 1%, about 2%, about 3%, or about 5% relative to the amount of fuel 114 introduced at the time the increase in oxygen in the exhaust gas is initially detected.

During operation of the gas turbine system 102, the equivalence ratio ($\varphi$) 404 can be monitored via the sensors 206, 224, or 312 on a continuous basis, at periodic time intervals, at random or non-periodic time intervals, when one or more changes to the gas turbine system 102 occur that could alter or change the equivalence ratio ($\varphi$) 404 of the exhaust stream 218, or any combination thereof. For example, changes that could occur to the gas turbine system 102 that could alter or change the equivalence ratio ($\varphi$) 404 can include a change in the composition of the fuel, a change in the composition of the oxidant, a degradation of the catalyst, for example, due to carbon formation, or a combination thereof. As such, the concentration of oxygen and/or carbon monoxide, for example, can be monitored, and adjustments can be made to the amount of oxidant 116 and/or fuel 114 to control the amounts of oxygen and/or carbon monoxide in the exhaust stream 218, the product gas 310, or both.

In at least one embodiment, reducing the equivalence ratio ($\varphi$) 404 can be carried out in incremental steps, non-incremental steps, a continuous manner, or any combination thereof. For example, the amount of oxidant 116 and/or the fuel 114 can be adjusted such that the equivalence ratio ($\varphi$) 404 changes by a fixed or substantially fixed amount per adjustment to the oxidant 116 and/or fuel 114, e.g., by about 0.001, by about 0.01, or by about 0.05. In another example, the amount of oxidant 116 and/or fuel 114 can be continuously altered such that the equivalence ratio ($\varphi$) 404 continuously changes. Preferably the amount of oxidant 116 and/or fuel 114 is altered and combustion is carried out for a period of time sufficient to produce an exhaust gas of substantially consistent composition, at which time the amount of oxidant 116 and/or fuel 114 can be adjusted to change the equivalence ratio ($\varphi$) 404 in an amount ranging from a low of about 0.00001, about 0.0001, or about 0.0005 to a high of about 0.001, about 0.01, or about 0.05. After the exhaust stream 218 achieves a substantially consistent concentration of oxygen the oxidant 116 and/or fuel 114 can again be adjusted such that the equivalence ratio ($\varphi$) 404 changes. The amount of oxygen and/or carbon monoxide in the exhaust stream 418 can be monitored and the amount of oxidant 116 and/or fuel 114 can be repeatedly adjusted until the exhaust stream 218 has a combined concentration of oxygen and carbon monoxide, for example, of less than about 2 mol % or less than about 1.5 mol %, or less than about 1 mol %.

The combustors 110 can be operated on a continuous basis such that the exhaust stream 218 has a combined oxygen and carbon monoxide concentration of less than 2 mol %, less than 1 mol %, less than 0.5 mol %, or less than about 0.1 mol %. In another example, the time during which combustion is carried out within the combustors 110, the exhaust stream 418 can have a combined oxygen and carbon monoxide concentration of less than 2 mol % or less than about 1 mol % for about 50%, 55%, 60%, 65%, 70%, 75%, 80%, 85%, 90%, or about 95% of the time during which the gas turbine engine-102 is operated. In other words, for a majority of the time that combustion is carried out within the combustors 110, the exhaust stream 418 can have a combined oxygen and carbon monoxide concentration of less than about 2 mol %, less than about 1 mol %, less than about 0.5 mol %, or less than about 0.1 mol %.

Once the overall control of the gas turbine engine 102 is set, the biasing needed for individual combustors 110 may be determined. For example, an oxidant flow adjusting device 202 for each individual combustor 110 can be adjusted by the control system 212 to maintain the measured value of the sensors 206, 224, or 312 at or near to a desired set-point. Several calculated values may be determined from the measured values of each sensor 206 or 312. These may include, for example, an average value that can be used to make similar adjustments to all of the oxidant flow adjusting devices 202 in the n combustors 110.

In addition, various difference values, for example, calculated based on differences of the measured values of two or more sensors 206, 224, or 312, may be used to make biasing adjustments to the oxidant flow adjusting devices 202 on one or more of the combustors 110 to minimize differences between the measured values of the sensors 206, 224, or 312. The control system 212 may also adjust the oxidant system 116 directly, such by adjusting compressor inlet guide vanes (IGV) or a speed control to change the oxidant flow rates, for example, to all of the combustors 110 at once. Further, the control system 212 can make similar adjustments to the fuel 114 to all combustors 110, depending, for example, on the speed selected for the gas turbine 102. As for the oxidant, the fuel supply to each of the combustors 110 may be individually biased to control the equivalence ratio of the burn. This is discussed further with respect to FIG. 6.

Figure 5:
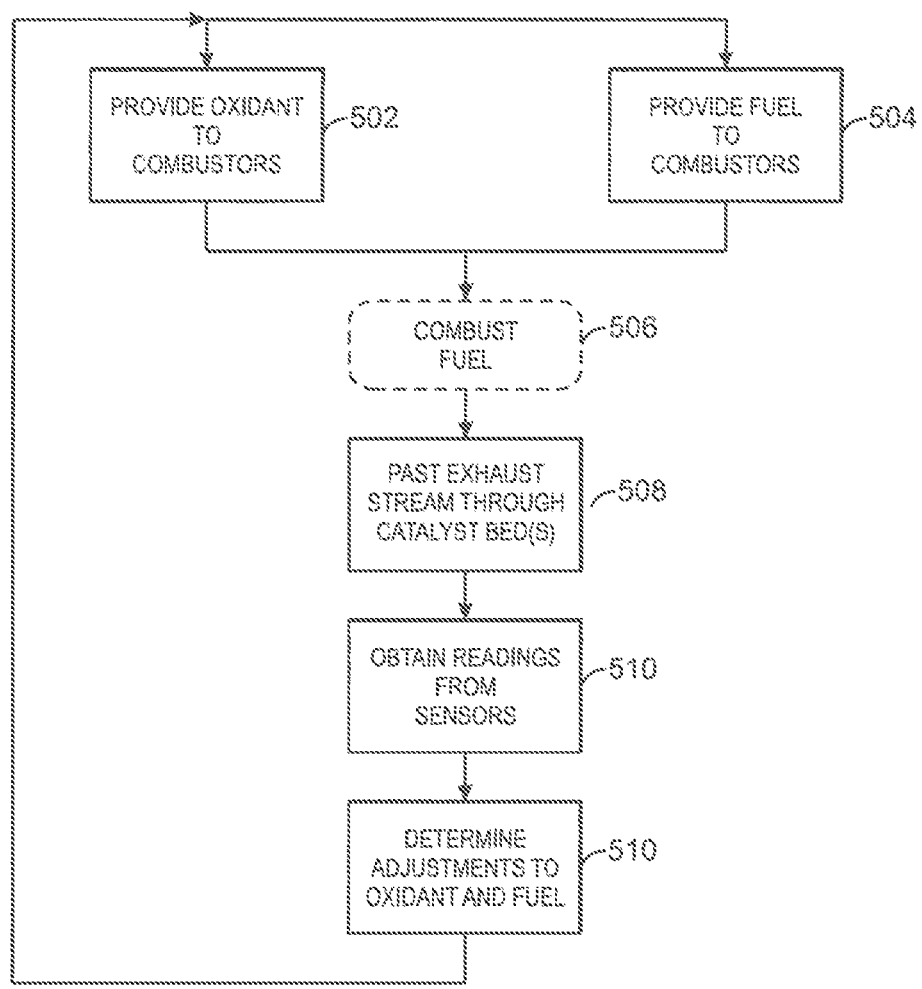
FIG. 5 is a block diagram of a method for adjusting fuel and oxidant levels to the combustors based on readings from an array of sensors.

FIG. 5 is a block diagram of a method 500 for adjusting fuel and oxidant levels to the combustors 110 based on readings from an array of sensors 206, 224, and 312. Like numbered items are as described in FIGS. 1, 2, and 3. It can be assumed that the gas turbine engine 102 has been started before the method 500 begins, and that all of the combustors 110 are using essentially the same mixture or a previous operation point. The method 500 begins at block 502, when a set-point for the oxidant 116 is entered and oxidant is provided to the combustors 110. In a substantially simultaneous manner, at block 504, a set-point is entered for the fuel 114, and fuel 114 is provided to the combustors 110. At block 506, the combustion process consumes the fuel 114 and oxidant 116 provided.

At block 508, the exhaust gas is passed through one or more catalyst beds, for example, including oxidation catalysts, water gas shift catalysts, or both. At block 510, readings are obtained from the sensors 206, 224, or 312. The readings may indicate the efficacy of the catalyst processes, by determining the concentrations of $H_2O$, $O_2$, $CO_2$, $H_2$, and other gas components. These may be used to determine global adjustments to the combustors. Further, individual sensors 206 along the exhaust expander ring 208 may be used to determine sums and differences of concentrations from individual combustors 110. The sums and differences may be combined to assist in identifying the combustors 110 that are contributing to a high oxygen or high carbon monoxide condition in the exhaust. This may also be performed by a swirl chart, as described above. Adjustments to the fuel 114 and oxidant 116 for those combustors 110 may be calculated and added to any global adjustments. Process flow then returns to blocks 502 and 504 with the new set points, wherein the method 500 repeats.

Control System

Figure 6:
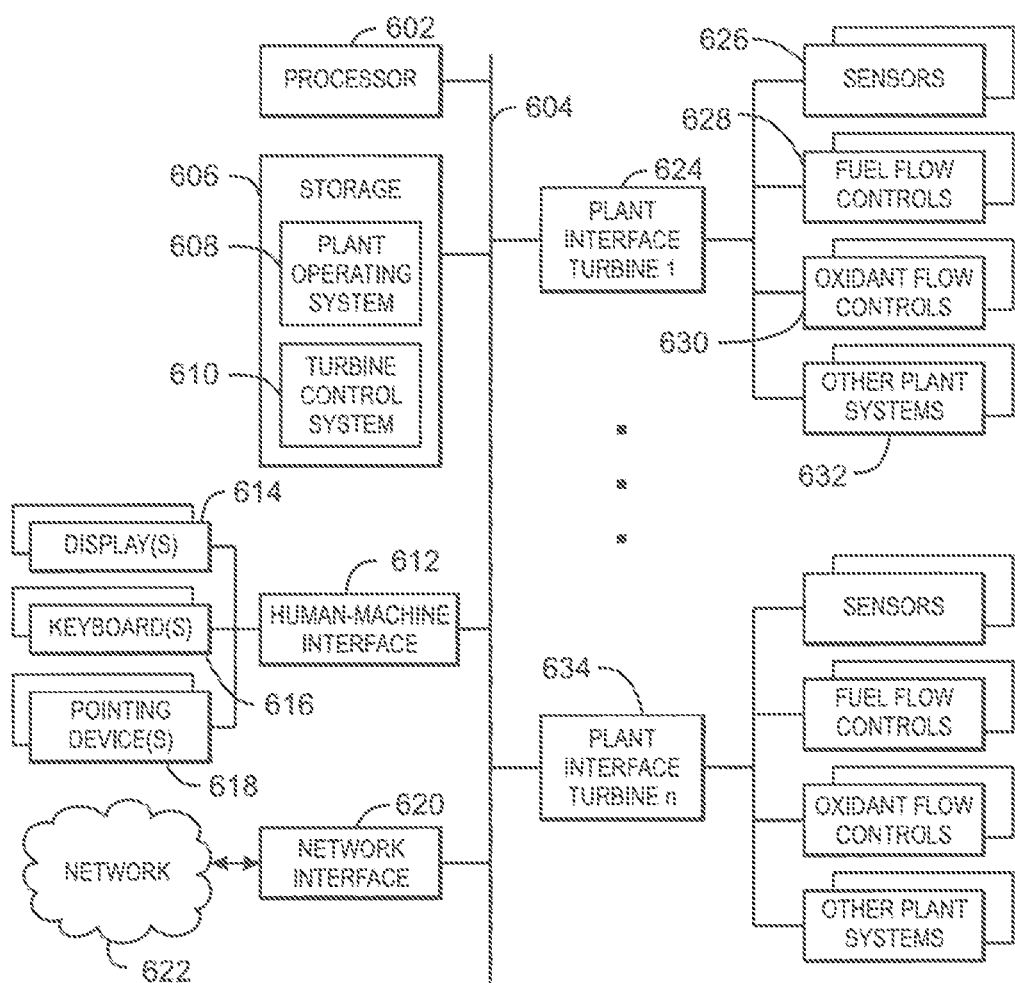
FIG. 6 is a block diagram of a plant control system that may be used to control the oxidant and fuel to the combustors in a gas turbine engine.

FIG. 6 is a block diagram of a plant control system 600 that may be used to control the oxidant 116 and fuel 114 to the combustors 110 in a gas turbine engine 102. As previously mentioned, the control system 600 may be a DCS, a PLC, a DDC, or any other appropriate control device. Further, any controllers, controlled devices, or monitored systems, including sensors, valves, actuators, and other controls, may be part of a real-time distributed control network, such as a FIELDBUS system, in accordance with IEC 61158. The plant control system 600 may host the control system 212 used to adjust the fuel 114 and oxidant 116 to the combustors 110, individually or as an ensemble.

The control system 600 may have a processor 602, which may be a single core processor, a multiple core processor, or a series of individual processors located in systems through the plant control system 600. The processor 602 can communicate with other systems, including distributed processors, in the plant control system 600 over a bus 604.

The bus 604 may be an Ethernet bus, a FIELDBUS, or any number of other buses, including a proprietary bus from a control system vendor. A storage system 606 may be coupled to the bus 604, and may include any combination of non-transitory computer readable media, such as hard drives, optical drives, random access memory (RAM) drives, and memory, including RAM and read only memory (ROM). The storage system 606 may store code used to provide operating systems 608 for the plant, as well as code to implement turbine control systems 610, for example, bases on the first or second methods discussed above.

A human-machine interface 612 may provide operator access to the plant control system 600, for example, through displays 614, keyboards 616, and pointing devices 618 located at one or more control stations. A network interface 620 may provide access to a network 622, such as a local area network or wide area network for a corporation.

A plant interface 624 may provide measurement and control systems for a first gas turbine system. For example, the plant interface 624 may read a number of sensors 626, such as the sensors 206, 224, and 312 described with respect to FIGS. 2 and 3. The plant interface 624 may also make adjustments to a number of controls, including, for example, fuel flow controls 628 used adjust the fuel 114 to the combustors 110 on the gas turbine 102. Other controls include the oxidant flow controls 630, used, for example, to adjust the actuator 404 on an oxidant flow adjusting device 402, the actuator 706 on a oxidant flow adjusting valve 702, or both, for each of the combustors 110 on the gas turbine 102. The plant interface 624 may also control other plant systems 632, such as generators used to produce power from the mechanical energy provided by the gas turbine 102. The additional plant systems 632 may also include the compressor systems used to provide oxidant 116 to the gas turbine 102.

The plant control system 600 is not limited to a single plant interface 624. If more turbines are added, additional plant interfaces 634 may be added to control those turbines. Further, the distribution of functionality is not limited to that shown in FIG. 6. Different arrangements could be used, for example, one plant interface system could operate several turbines, while another plant interface system could operate compressor systems, and yet another plant interface could operate generation systems.

TABLE 1

Simulation results for catalyst beds in HRSG

Figure 7:
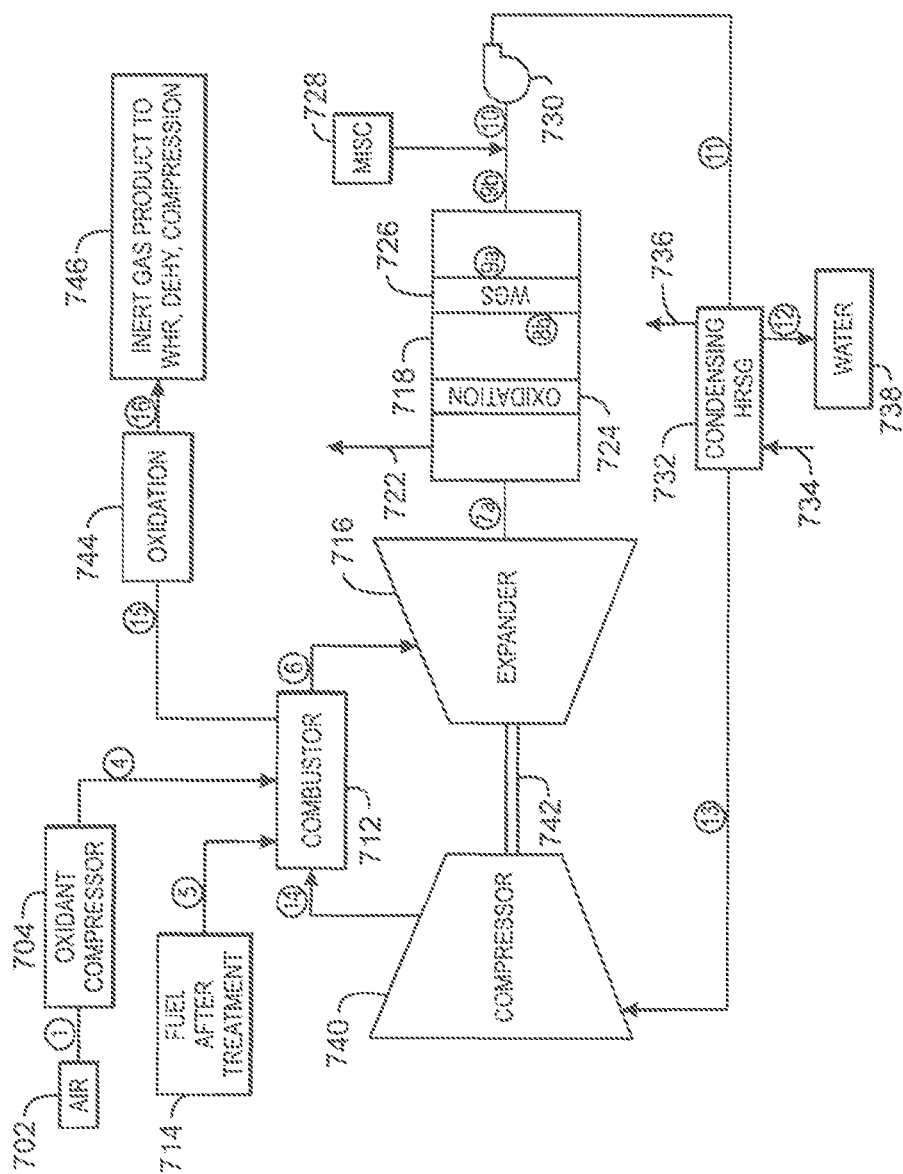
FIG. 7 is a schematic of a simulated gas turbine system that illustrates the use of two catalyst beds in a heat-recovery steam generator (HRSG) to reduce the concentration of selected components in an exhaust stream.

| | A | | | | | | |
|---|---|---|---|---|---|---|---|
| Stream Name in FIG. 7 | 1 | 4 | 5 | 6 | 7a | 8b | 9a |
| Description | Air to MAC | Air ex BAC | Fuel Gas | To Expander | Ex Expander | To WGS | Ex WGS |
| Temperature [C.] | 10.6 | 400.0 | 54.5 | 1472.6 | 619.2 | 144.0 | 145.6 |
| Pressure [kPa] | 101.33 | 2496.65 | 4208.18 | 2157.68 | 106.46 | 102.99 | 102.34 |
| Molar Flow [kmol/sec] | 12.17 | 12.17 | 1.31 | 25.11 | 29.79 | 29.79 | 29.79 |
| Mass Flow [kg/sec] | 351.00 | 351.01 | 22.60 | 713.36 | 850.53 | 850.53 | 850.53 |
| Molecular Weight | 28.85 | 28.85 | 17.24 | 28.41 | 28.55 | 28.55 | 28.55 |
| Mass Density [kg/m3] | 1.240 | 12.769 | 28.398 | 4.210 | 0.410 | 0.848 | 0.840 |
| Heat Flow [kW] | −38,633 | 104,695 | −103,502 | −525,545 | −1,512,800 | −1,985,133 | −1,985,149 |
| Higher Heating Value [kJ/kmol] | 443.8 | 443.8 | 853006.3 | 6093.5 | 5616.3 | 5616.3 | 5566.0 |
| Lower Heating Value [kJ/kmol] | 0.00 | 0.00 | 774305.31 | 613.11 | 609.41 | 609.41 | 559.09 |
| (CO2) [kmol/sec] | 0.03% | 0.03% | 2.00% | 10.21% | 10.39% | 10.39% | 10.51% |
| (H2O) [kmol/sec] | 1.08% | 1.08% | 0.10% | 13.31% | 12.10% | 12.10% | 11.98% |
| (Hydrogen) [ppmv] | 0 | 0 | 0 | (587) | (1082) | (1082) | (2308) |
| (CO) [ppmv] | 0 | 0 | 0 | (1619) | (1228) | (1228) | (2) |
| (Nitrogen) [lbmole/hr] | 77.24% | 77.24% | 3.00% | 75.29% | 76.30% | 76.30% | 76.30% |
| (Oxygen) [ppmv] | (207203) | (207203) | 0 | (604) | (742) | (742) | (742) |
| (Argon) [kmol/sec] | 0.93% | 0.93% | 0.00% | 0.90% | 0.90% | 0.90% | 0.90% |
| (Methane) [kmol/sec] | 0.00% | 0.00% | 92.91% | 0.00% | 0.00% | 0.00% | 0.00% |
| (Ethane) [kmol/sec] | 0.00% | 0.00% | 2.00% | 0.00% | 0.00% | 0.00% | 0.00% |
| (NO) [ppmv] | 0 | 0 | 0 | (143) | (0) | (0) | 0 |
| (NO2) [ppmv] | 0 | 0 | 0 | (0) | 0 | 0 | 0 |
| (H2S) [ppmv] | 0 | 0 | (1) | (0) | (0) | (0) | (0) |
| (COS) [ppmv] | 0 | 0 | 0 | (0) | (0) | (0) | (0) |

TABLE 1-continued

Simulation results for catalyst beds in HRSG

| (SO2) [ppmv] | 0 | 0 | 0 | (0) | (0) | (0) | (0) |
| (SO3) [ppmv] | 0 | 0 | 0 | (0) | (0) | (0) | (0) |

B

| Stream Name in FIG. 7 | 9b | 10 | 11 | 12 | 13 | 14 | 15 | 16 |
|---|---|---|---|---|---|---|---|---|
| Description | Ex HRSG | To EGR Blw | Ex EGR Blw | Produced H2O | EGR to RGT | EGR to Comb | Purge Extr | Ex Extr Cat |
| Temperature [C.] | 60.9 | 61.1 | 84.4 | 39.4 | 39.4 | 448.1 | 462.1 | 472.1 |
| Pressure [kPa] | 102.07 | 102.07 | 124.88 | 446.09 | 119.96 | 2276.04 | 2018.82 | 1998.14 |
| Molar Flow [kmol/sec] | 29.79 | 29.93 | 29.93 | 2.73 | 27.87 | 23.16 | 11.56 | 11.55 |
| Mass Flow [kg/sec] | 850.53 | 853.13 | 853.13 | 49.13 | 815.94 | 678.25 | 338.54 | 338.54 |
| Molecular Weight | 28.55 | 28.50 | 28.50 | 18.02 | 29.28 | 29.28 | 29.28 | 29.30 |
| Mass Density [kg/m3] | 1.051 | 1.049 | 1.199 | 996.526 | 1.354 | 11.043 | 9.616 | 9.396 |
| Heat Flow [kW] | −2,064,031 | −2,095,760 | −2,074,175 | −777,479 | −1,617,366 | −1,040,710 | −513,319 | −513,319 |
| Higher Heating Value [kJ/kmol] | 5566.0 | 5717.9 | 5717.9 | 41007.3 | 3101.6 | 3101.6 | 3086.7 | 2755.3 |
| Lower Heating Value [kJ/kmol] | 559.09 | 556.57 | 556.57 | 0.00 | 597.82 | 597.82 | 594.32 | 261.18 |
| (CO2) [kmol/sec] | 10.51% | 10.47% | 10.47% | 0.00% | 11.25% | 11.25% | 11.25% | 11.26% |
| (H2O) [kmol/sec] | 11.98% | 12.36% | 12.36% | 99.99% | 5.86% | 5.86% | 5.83% | 5.97% |
| (Hydrogen) [ppmv] | (2308) | (2298) | (2298) | (0) | (2468) | (2468) | (2453) | (1078) |
| (CO) [ppmv] | (2) | (3) | (3) | (0) | (3) | (3) | (3) | (2) |
| (Nitrogen) [lbmole/hr] | 76.30% | 75.97% | 75.97% | 0.00% | 81.60% | 81.60% | 81.62% | 81.68% |
| (Oxygen) [ppmv] | (742) | (738) | (738) | (0) | (793) | (793) | (785) | (97) |
| (Argon) [kmol/sec] | 0.90% | 0.90% | 0.90% | 0.00% | 0.97% | 0.97% | 0.97% | 0.97% |
| (Methane) [kmol/sec] | 0.00% | 0.00% | 0.00% | 0.00% | 0.00% | 0.00% | 0.00% | 0.00% |
| (Ethane) [kmol/sec] | 0.00% | 0.00% | 0.00% | 0.00% | 0.00% | 0.00% | 0.00% | 0.00% |
| (NO) [ppmv] | 0 | (0) | (0) | (0) | (0) | (0) | (0) | (0) |
| (NO2) [ppmv] | 0 | (0) | (0) | 0 | 0 | 0 | 0 | 0 |
| (H2S) [ppmv] | (0) | (0) | (0) | (0) | (0) | (0) | 0 | 0 |
| (COS) [ppmv] | (0) | (0) | (0) | (0) | (0) | (0) | 0 | 0 |
| (SO2) [ppmv] | (0) | (0) | (0) | (0) | (0) | (0) | 0 | 0 |
| (SO3) [ppmv] | (0) | (0) | (0) | (0) | (0) | (0) | 0 | 0 |

Simulated Results

FIG. 7 is a schematic of a simulated gas turbine system 700 that illustrates the use of two catalyst beds in a heat-recovery steam generator (HRSG) to reduce the concentration of selected components in an exhaust stream. The reference numbers shown in circles in the drawing correspond to the stream names indicated in Table 1. The values in Table 1 are the results for the conditions and concentrations generated in a simulation. The simulation was performed using the HYSYS Process Modeling system from AspenTech.

For purposes of the simulation, air 702 was used as the oxidant, although any number of other oxidant blends could be used. The air 702 was fed to a main air compressor 704, which caused a significant increase in the temperature of the air 702. The main air compressor may comprise one or more compressor stages with possible cooling between the stages. The compressed air was then injected into a combustor 712.

Fuel gas 714, which may be treated to remove impurities such as sulfur compounds, was injected into the combustor 712. The fuel gas 714 can be compressed before the injection. Although the air 702 and fuel 714 were injected directly into the combustor 712 in the simulation, it can be understood that any number of other configurations are possible. For example, the air 702 and fuel 714 may be mixed prior to injection into the combustor 712.

The exhaust gases from the combustor 712 were flowed into an expander turbine 716, which is turned by expansion of the exhaust gases. From the expander turbine 716, the exhaust gases were flowed to a heat-recovery steam generator (HRSG) 718. In the HRSG 718, a water stream 720 is boiled to form a steam stream 722, cooling the exhaust gases.

An oxidation catalyst bed 724 may be located in the HRSG 718 at a point where the temperature was still quite high, e.g., about 468° C. as indicated in Table 1. However, the simulation results in Table 1 do not include an oxidation catalyst.

The simulation did model a water gas shift (WSG) catalyst bed 726 located at a cooler point in the HRSG 718, e.g., about 144° C. as shown in Table 1. The exhaust flowing through the WSG catalyst bed 726 showed a substantial change in CO, which dropped from about 1228 ppmv to about 2 ppmv. Confirmation of the WSG reaction was provided by the hydrogen levels, which increased from 1082 ppmv to 2308 ppmv, and the water levels, which dropped from 12.10% to 11.98%.

The product gas from the HRSG 718 was flowed to a compressor 730 for boosting the pressure to form a recycle stream. From the compressor 730, the recycle stream was flowed through a condensing HRSG 732. In the condensing HRSG 732, a flow of water 734 is heated against the recycle stream, forming an outlet stream 736 that include hot water or steam. The outlet stream 736 may be used for other plant purposes, such as heating and utilities, or may be used as the water stream 720 to the HRSG 718. The cooling of the recycle stream caused water 738 to condense from the water vapor in the recycle stream. The water 738 can be discarded or may be used as a water source for the process, or exported as a product.

From the condensing HRSG 732, the recycle stream was fed to the compression turbine 740, which is powered through mechanical energy provided by the expander turbine 716 through a shaft 742. Although the shaft was shown as providing a direct connection in the simulation, other configurations could be used, including separate units, multiple shafts, and the like. Further, the shaft 742 may be extended to a generator to provide electrical power. The compressed recycle stream was then reinjected into the combustor 712 to provide cooling.

In the simulation, a side stream was removed from the combustor 712 to function as a process purge. The side stream was flowed through a separate oxidation catalyst bed 744, which caused a small decrease in the CO content, e.g., 3 ppmv to 2 ppmv, a large reduction in the hydrogen level, e.g. from 2453 to 1079 ppm, a large reduction in the oxygen level, e.g. from 785 to 97 ppm, and a small increase in the water concentration, e.g. from 5.83 to 5.97%, in the simulation results. The purge 746 may then be used to generate additional steam or process heat in a waste heat recovery unit (e.g. a heat exchanger similar in function as a HRSG), compressed, dehydrated in a glycol or similar dehydration unit and/or separated into $CO_2$ rich and $CO_2$ lean streams. The purge 746 or the $CO_2$ rich or $CO_2$ lean streams may subsequently be injected into a subterranean reservoir for the purpose of enhanced hydrocarbon recovery, $CO_2$ sequestration or both. It can be noted that a portion of the fuel 714 can be diverted to the catalyst beds.

Embodiments

Embodiments of the invention may include any combinations of the methods and systems shown in the following numbered paragraphs. This is not to be considered a complete listing of all possible embodiments, as any number of variations can be envisioned from the description above.

1. A method for combusting a fuel in a gas turbine, including:
   providing a fuel to a combustor on a gas turbine;
   providing an oxidant to the combustor;
   combusting the fuel and the oxidant in the combustor to produce an exhaust gas; and
   passing at least a portion of the exhaust gas through a water-gas shifting catalyst to form a low CO content product gas.
2. The method of paragraph 1, including providing a diluent to the gas turbine and gas turbine combustor; and mixing a first portion of the diluent with at least one of the fuel, the oxidant, and the exhaust gas to cool the combustor, exhaust gas, or both.
3. The method of paragraph 2, including:
   extracting a second portion of diluent from the gas turbine or gas turbine combustor; and
   delivering the said second portion of diluent to an oxidation catalyst unit configured to oxidize carbon monoxide, hydrogen and unburned hydrocarbons to carbon dioxide and water vapor and to produce a low oxygen content product gas.
4. The method of any of paragraphs 1-3, including:
   compressing an oxidizing stream; and
   providing a first portion of the oxidizing stream as the oxidant to the combustor.
5. The method of any of paragraphs 1-4, including:
   compressing a fuel stream; and
   providing a first portion of the fuel stream as the fuel to the combustor.
6. The method of any of paragraphs 2-5, including compressing the diluent prior to delivering the first portion of diluent to the combustor and extracting a second portion of the diluent.
7. The method of paragraph 5, including providing a second portion of the fuel stream as a deoxidation fuel to an oxidation catalyst unit.
8. The method of paragraph 3, including providing a second portion of the oxidant as an oxidizer to the catalyst unit.
9. The method of paragraph 4 including providing essentially ambient air as the oxidizing stream.
10. The method of any of paragraphs 1-9, including:
    measuring a parameter of the exhaust gas; and
    adjusting a fuel flow rate, an oxidant flow rate, or both to adjust the parameter to within a target set-point range.
11. The method of any of paragraphs 1-10, including:
    measuring a parameter of the low CO content product gas; and
    adjusting a fuel flow rate, an oxidant flow rate, or both to adjust the parameter to within a target set-point range.
12. The method of any of paragraphs 1-11, including measuring a parameter including oxygen concentration, carbon monoxide concentration, hydrogen concentration, unburned hydrocarbon concentration, nitrogen oxides or any combinations thereof in the exhaust gas, the low CO content product gas, or both.
13. The method of paragraph 12, including determining an equivalence ratio from the parameter.
14. The method of any of paragraphs 1-13, including adjusting the ratio of the fuel to the oxidant to form a substantially stoichiometric mixture.
15. The method of any of paragraphs 1-14, including adjusting the ratio of the fuel to the oxidant to obtain an exhaust gas including between about 100 parts-per-million (ppm) of carbon monoxide (CO) and about 5000 ppm of CO.
16. The method of any of paragraphs 1-15, including:
    cooling the low CO content product gas to remove water;
    compressing the low CO content product gas; and
    recirculating the low CO content product gas to a combustor as a diluent.
17. The method of any of paragraphs 1-16, including:
    driving an expander turbine with the exhaust gas; and
    generating mechanical power.
18. The method of any of paragraphs 1-17, including passing the exhaust gas through a second at least on oxidation catalyst bed configured to oxidize carbon monoxide, hydrogen and unburned hydrocarbons to carbon dioxide and water vapor.
19. The method of any of paragraphs 1-18, including injecting at least a portion of at least one of the low CO content product gas and low oxygen content product gas into a subterranean reservoir.
20. The method of paragraph 19, including compressing the portion of the at least one of the low CO content product gas and low oxygen content product gas with a compressor prior to injecting the portion of the at least one of the low CO content product gas and low oxygen content product gas into the subterranean reservoir.
21. The method of any of paragraphs 3-20, including processing at least a portion of at least one of the low CO content product gas and low oxygen content product gas in a gas dehydration unit.
22. The method of any of paragraphs 3-21, including processing at least a portion of at least one of the low CO content product gas and low oxygen content product gas in a carbon dioxide separation unit to produce a lean carbon dioxide stream and a rich carbon dioxide stream.
23. The method of paragraph 22, including injecting at least a portion of the lean carbon dioxide stream into a subterranean reservoir.
24. The method of paragraphs 22 or 23, including injecting at least a portion of the rich carbon dioxide stream into a subterranean reservoir.
25. The method of any of paragraphs 22-24, including providing at least a portion of the rich carbon dioxide stream to a carbon sequestration unit.

26. The method of paragraph 23, including compressing at least a portion of the lean carbon dioxide stream prior to injecting the lean carbon dioxide stream into the subterranean reservoir.

27. The method of paragraph 24, further compressing the at least a portion of the rich carbon dioxide stream to at least one rich product compressor prior to delivering the rich carbon dioxide stream to a subterranean reservoir for enhanced hydrocarbon recovery.

28. The method of paragraph 25, including compressing at least a portion of the rich carbon dioxide stream prior to providing the rich carbon dioxide stream to a carbon sequestration unit.

29. The method of any of paragraphs 22-28, including processing at least a portion of the lean carbon dioxide stream in a gas dehydration unit.

30. The method of any of paragraphs 22-29, including processing at least a portion of the rich carbon dioxide stream in a gas dehydration unit.

31. The method of any of paragraphs 1-30, including cooling the exhaust gas in a heat recovery steam generator to produce steam.

32. The method of paragraph 31, including:
driving a steam turbine with the steam; and
generating mechanical power.

33. The method of paragraph 31, including heating process fluids with the steam.

34. The method of any of paragraphs 1-33, including cooling the exhaust gas in a heat recovery unit; and
heating process fluids.

35. The method of any of paragraphs 3-34, including measuring a parameter including oxygen concentration, carbon monoxide concentration, hydrogen concentration, unburned hydrocarbon concentration, nitrogen oxides or any combinations thereof in the low oxygen content product gas.

36. The method of paragraph 35, including adjusting the flow rate of the deoxidation fuel to cause the parameter to reach a target range.

37. The method of paragraph 35, including adjusting the flow rate of the oxidant to cause the parameter to reach a target range.

38. A gas turbine system, including:
an oxidant system;
a fuel system;
a control system;
a combustor adapted to receive and combust an oxidant from the oxidant system and a fuel from the fuel system to produce an exhaust gas; and
a catalyst unit including a water gas shifting (WGS) catalyst configured to reduce the concentration of carbon monoxide in the exhaust gas to form a low CO content product gas.

39. The gas turbine system of paragraph 38, including a sensor in communication with the control system, wherein the sensor is adapted to measure at least one parameter of the exhaust gas, the low CO content product gas, or both, and wherein the control system is configured to adjust the oxidant, the fuel, or both, based, at least in part, on the parameter measured by the sensor.

40. The gas turbine system of paragraphs 38 or 39, including a recirculation loop between an outlet of an expander section of a gas turbine engine and an inlet to a compressor section of the gas turbine engine.

41. The gas turbine system of paragraph 40 including a heat-recovery steam generator (HRSG) configured to receive the exhaust gas from the gas turbine engine and to generate steam from the residual heat of the exhaust gas.

42. The gas turbine system of paragraph 40, wherein the HRSG includes at least one catalyst bed.

43. The gas turbine system of paragraph 42, wherein the catalyst bed includes the WGS catalyst, and wherein the catalyst bed is located in a zone in the HRSG that reaches a temperature between about 100° C. and about 450° C.

44. The gas turbine system of paragraph 42, wherein the catalyst bed includes an oxidation catalyst, and wherein the catalyst bed is located in a zone in the HRSG that reaches a temperature between about 200° C. and 600° C.

45. The gas turbine system of any of paragraphs 38-44, including a plurality of combustors, wherein each combustor has an oxidant-flow adjustment device.

46. The gas turbine system of paragraph 45, wherein the oxidant-flow adjustment device includes a flow control valve.

47. The gas turbine system of paragraph 45, wherein the oxidant flow to each of the plurality of combustors is individually adjusted.

48. The gas turbine system of any of paragraphs 40-47, including a second heat recovery unit in the recirculation loop.

49. The gas turbine system of any of paragraphs 40-48, including a sensor installed in the recirculation loop, wherein the sensor is configured to measure the constituents within the low CO content product gas.

50. The gas turbine system of any of paragraphs 40-49, including a booster blower in the recirculation loop, wherein the booster blower is disposed downstream of the HRSG.

51. The gas turbine system of any of paragraphs 40-50, including a heat exchanger within the recirculation loop upstream of the compressor section of the gas turbine engine cooling the product stream.

52. The gas turbine system of any of paragraphs 38-51, including a gas dehydration unit.

53. The gas turbine system of any of paragraphs 38-52, including a carbon dioxide separation unit configured to separate the product gas into a lean carbon dioxide stream and a rich carbon dioxide stream.

54. A heat recovery unit, including:
a heat exchanger configured to remove heat energy from an exhaust gas; and
a water gas shifting (WGS) catalyst bed configured to reduce a concentration of a target gas in the exhaust gas.

55. The heat recovery unit of paragraph 54, wherein the WGS catalyst bed is located in a temperature region selected for operation of the WSG catalyst.

56. The heat recovery unit of paragraphs 54 or 55s, including a second catalyst bed wherein the second catalyst bed includes an oxidation catalyst located in a temperature region selected for operation of the oxidation catalyst.

57. The heat recovery unit of paragraph 54, 55, or 56, including a heat recovery steam generator, including:
water circulation tubes configured to boil water into steam as the exhaust gas is passed over the tubes; and
a surface coating over at least a portion of the tubes, wherein the surface coating includes a refractory oxide support holding metal catalytic sites.

58. The heat recovery unit of paragraph 57, wherein the metal catalytic sites are selected to perform a water gas shift reaction.

59. The heat recovery unit of paragraph 57, wherein the metal catalytic sites are selected to perform an oxidation reaction.

While the present techniques may be susceptible to various modifications and alternative forms, the exemplary embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method for combusting a fuel in a gas turbine, comprising:
   providing a fuel to a combustor on a gas turbine;
   providing an oxidant to the combustor;
   combusting the fuel and the oxidant in the combustor to produce a combustor exhaust gas;
   expanding the combustor exhaust gas in a turbine expander to produce an exhaust gas that comprises water vapor, carbon dioxide, and between 1,000 and 5,000 ppmv of each carbon monoxide and hydrogen;
   passing at least a portion of the exhaust gas to a heat recovery unit that comprises a water-gas shifting catalyst; and
   converting a portion of the carbon monoxide and water vapor within the exhaust gas passed through the heat recovery unit into carbon dioxide and hydrogen via a water gas shift reaction to form a low CO content product gas.

2. The method of claim 1, comprising providing a diluent to the gas turbine and gas turbine combustor; and mixing a first portion of the diluent with at least one of the fuel, the oxidant, and the exhaust gas to cool the combustor, exhaust gas, or both.

3. The method of claim 2, comprising:
   extracting a second portion of diluent from the gas turbine or gas turbine combustor; and
   delivering the said second portion of diluent to an oxidation catalyst unit configured to oxidize carbon monoxide, hydrogen and unburned hydrocarbons to carbon dioxide and water vapor and to produce a low oxygen content product gas.

4. The method of claim 1, comprising:
   compressing an oxidizing stream; and
   providing a first portion of the oxidizing stream as the oxidant to the combustor.

5. The method of claim 1, comprising:
   compressing a fuel stream; and
   providing a first portion of the fuel stream as the fuel to the combustor.

6. The method of claim 2, comprising compressing the diluent prior to delivering the first portion of diluent to the combustor and extracting a second portion of the diluent.

7. The method of claim 5, comprising providing a second portion of the fuel stream as a deoxidation fuel to an oxidation catalyst unit.

8. The method of claim 3, comprising providing a second portion of the oxidant as an oxidizer to the catalyst unit.

9. The method of claim 4 comprising providing essentially ambient air as the oxidizing stream.

10. The method of claim 1, comprising:
    measuring a parameter of the exhaust gas; and
    adjusting a fuel flow rate, an oxidant flow rate, or both to adjust the parameter to within a target set-point range.

11. The method of claim 1, comprising:
    measuring a parameter of the low CO content product gas; and
    adjusting a fuel flow rate, an oxidant flow rate, or both to adjust the parameter to within a target set-point range.

12. The method of claim 1, comprising measuring a parameter comprising oxygen concentration, carbon monoxide concentration, hydrogen concentration, unburned hydrocarbon concentration, nitrogen oxides or any combinations thereof in the exhaust gas, the low CO content product gas, or both.

13. The method of claim 12, comprising determining an equivalence ratio from the parameter.

14. The method of claim 1, comprising adjusting the ratio of the fuel to the oxidant to form a substantially stoichiometric mixture.

15. The method of claim 1, comprising adjusting the ratio of the fuel to the oxidant to obtain an exhaust gas comprising between about 100 parts-per-million (ppm) of carbon monoxide (CO) and about 5000 ppm of CO.

16. The method of claim 1, comprising:
    cooling the low CO content product gas to remove water;
    compressing the low CO content product gas;
    recirculating the low CO content product gas to the combustor as a diluent; and
    providing the diluent to the combustor separately from the oxidant and the fuel.

17. The method of claim 1, comprising:
    driving an expander turbine with the exhaust gas; and
    generating mechanical power from the turbine expander.

18. The method of claim 1, comprising passing the at least a portion of the exhaust gas through an oxidation catalyst bed configured to oxidize carbon monoxide, hydrogen and unburned hydrocarbons to carbon dioxide and water vapor.

19. The method of claim 1, comprising injecting at least a portion of at least one of the low CO content product gas and low oxygen content product gas into a subterranean reservoir.

20. The method of claim 19, comprising compressing the portion of the at least one of the low CO content product gas and low oxygen content product gas with a compressor prior to injecting the portion of the at least one of the low CO content product gas and low oxygen content product gas into the subterranean reservoir.

21. The method of claim 3, comprising processing at least a portion of at least one of the low CO content product gas and low oxygen content product gas in a gas dehydration unit.

22. The method of claim 3, comprising processing at least a portion of at least one of the low CO content product gas and low oxygen content product gas in a carbon dioxide separation unit to produce a lean carbon dioxide stream and a rich carbon dioxide stream.

23. The method of claim 22, comprising injecting at least a portion of the lean carbon dioxide stream into a subterranean reservoir.

24. The method of claim 22, comprising injecting at least a portion of the rich carbon dioxide stream into a subterranean reservoir.

25. The method of claim 22, comprising providing at least a portion of the rich carbon dioxide stream to a carbon sequestration unit.

26. The method of claim 23, comprising compressing at least a portion of the lean carbon dioxide stream prior to injecting the lean carbon dioxide stream into the subterranean reservoir.

27. The method of claim 24, further compressing the at least a portion of the rich carbon dioxide stream to at least one rich product compressor prior to delivering the rich carbon dioxide stream to a subterranean reservoir for enhanced hydrocarbon recovery.

28. The method of claim 25, comprising compressing at least a portion of the rich carbon dioxide stream prior to providing the rich carbon dioxide stream to a carbon sequestration unit.

29. The method of claim 22, comprising processing at least a portion of the lean carbon dioxide stream in a gas dehydration unit.

30. The method of claim 22, comprising processing at least a portion of the rich carbon dioxide stream in a gas dehydration unit.

31. The method of claim 1, comprising cooling the exhaust gas in a heat recovery steam generator to produce steam.

32. The method of claim 31, comprising:
driving a steam turbine with the steam; and
generating mechanical power.

33. The method of claim 31, comprising heating process fluids with the steam.

34. The method of claim 1, comprising:
cooling the exhaust gas in a heat recovery unit; and
heating process fluids.

35. The method of claim 3, comprising measuring a parameter comprising oxygen concentration, carbon monoxide concentration, hydrogen concentration, unburned hydrocarbon concentration, nitrogen oxides or any combinations thereof in the low oxygen content product gas.

36. The method of claim 35, comprising adjusting the flow rate of the deoxidation fuel to cause the parameter to reach a target range.

37. The method of claim 35, comprising adjusting the flow rate of the oxidant to cause the parameter to reach a target range.

38. A gas turbine system, comprising:
an oxidant system;
a fuel system;
a control system;
a combustor adapted to receive and combust an oxidant from the oxidant system and a fuel from the fuel system to produce a combustor exhaust gas;
a turbine expander fluidly coupled to the combustor to receive the combustor exhaust gas and produce an exhaust gas comprising water vapor, carbon dioxide, and between 1,000 and 5,000 ppmv of each carbon monoxide and hydrogen; and
a heat recovery unit fluidly coupled to the expander that comprises a catalyst unit, the catalyst unit comprising a water gas shifting (WGS) catalyst configured to reduce the concentration of carbon monoxide in the exhaust gas to form a low CO content product gas.

39. The gas turbine system of claim 38, comprising a sensor in communication with the control system, wherein the sensor is adapted to measure at least one parameter of the exhaust gas, the low CO content product gas, or both, and wherein the control system is configured to adjust the oxidant, the fuel, or both, based, at least in part, on the parameter measured by the sensor.

40. The gas turbine system of claim 38, comprising a recirculation loop between an outlet of an expander section of a gas turbine engine and an inlet to a compressor section of the gas turbine engine.

41. The gas turbine system of claim 40 comprising a heat-recovery steam generator (HRSG) configured to receive the exhaust gas from the gas turbine engine and to generate steam from the residual heat of the exhaust gas.

42. The gas turbine system of claim 40, comprising a booster blower in the recirculation loop, wherein the booster blower is disposed downstream of the HRSG.

43. The gas turbine system of claim 40, comprising a heat exchanger within the recirculation loop upstream of the compressor section of the gas turbine engine cooling the product stream.

44. A heat recovery unit, comprising:
a heat exchanger configured to remove heat energy from an exhaust gas; and
a water gas shifting (WGS) catalyst bed configured to reduce a concentration of a target gas in the exhaust gas.

45. The heat recovery unit of claim 44, wherein the WGS catalyst bed is located in a temperature region selected for operation of the WSG catalyst.

* * * * *